US012633078B2

(12) United States Patent
Beauchamp et al.

(10) Patent No.: US 12,633,078 B2
(45) Date of Patent: May 19, 2026

(54) VOLUMETRIC PERMISSIONING

(71) Applicant: Shopify Inc., Ottawa (CA)

(72) Inventors: Daniel Beauchamp, Ottawa (CA);
James Lepp, Ottawa (CA)

(73) Assignee: Shopify Inc., Ottawa (CA)

( * ) Notice: Subject to any disclaimer, the term of this patent is extended or adjusted under 35 U.S.C. 154(b) by 448 days.

(21) Appl. No.: 17/850,766

(22) Filed: Jun. 27, 2022

(65) Prior Publication Data

US 2023/0419635 A1 Dec. 28, 2023

(51) Int. Cl.
G06V 10/25 (2022.01)
G06F 3/04815 (2022.01)
G06V 40/20 (2022.01)

(52) U.S. Cl.
CPC .......... G06V 10/25 (2022.01); G06F 3/04815 (2013.01); G06V 40/28 (2022.01)

(58) Field of Classification Search
None
See application file for complete search history.

(56) References Cited

U.S. PATENT DOCUMENTS

| | | | | |
|---|---|---|---|---|
| 7,366,359 | B1 * | 4/2008 | Davey .................... | G06V 10/22 |
| | | | | 346/143 |
| 8,219,144 | B2 * | 7/2012 | Benco .................. | H04N 1/4426 |
| | | | | 455/456.2 |
| 9,124,762 | B2 * | 9/2015 | Cutler ...................... | G06T 7/11 |

| | | | | |
|---|---|---|---|---|
| 9,794,518 | B2 * | 10/2017 | Barcala ............ | G08B 13/19689 |
| 9,854,206 | B1 * | 12/2017 | Ren ......................... | H04N 7/147 |
| 10,311,251 | B2 * | 6/2019 | Singh .................. | G06F 21/6263 |
| 10,956,726 | B1 * | 3/2021 | Quark .................. | G06V 20/653 |
| 11,115,627 | B1 * | 9/2021 | Drako .................. | G08B 25/006 |
| 11,165,789 | B1 * | 11/2021 | Smith ...................... | G06F 9/542 |
| 11,880,544 | B1 * | 1/2024 | Fenn .................. | G01C 21/3852 |
| 12,026,839 | B1 * | 7/2024 | Dhayakar .......... | H04N 21/4318 |

(Continued)

OTHER PUBLICATIONS

Azzam, R., Taha, T., Huang, S. et al. Feature-based visual simultaneous localization and mapping: a survey. SN Appl. Sci. 2, 224 ( 2020). https://doi.org/10.1007/s42452-020-2001-3 (Year: 2020).*

(Continued)

*Primary Examiner* — Ian L Lemieux

(74) *Attorney, Agent, or Firm* — Foley & Lardner LLP

(57) ABSTRACT

Described herein are systems and methods for generating and transmitting media data feeds location-based privacy settings. Embodiments generate, store, and reference location-based privacy settings that instruct the computing device to generate obfuscations in the media data. The obfuscations may include computer-generated or user gesture-generated obfuscation regions that instruct the computing device to apply the obfuscations to portions of the video feed. The computing device may be pre-configured to recognize certain objects or regions (or portions thereof) and remove, blur, or substitute them from the live video stream or 3D data according to privacy settings. The privacy settings may be relative to the location in which the user and computing device are situated. In operation, the computing device may determine the location and then apply the location-specific privacy settings to obfuscate a portion of the video feed while being generated and transmitted.

21 Claims, 12 Drawing Sheets

500

Computing device receives real-world location data from a customer and receives configuration input indicating that a customer privacy setting is associated with the real-world location
502

Computing device detects the real-world location based upon one or more types of data indicating the real-world location (e.g., geolocation, location type, geo-fenced location) in which customer device is located
504

Computing device applies the obfuscation action to the obfuscation region of the media data feed responsive to a triggering instruction, in accordance with the privacy settings associated with the real-world location
506

Computing device transmits the media data having obfuscation region(s) over one or more networks to receiving device(s)
508

(56)     References Cited

U.S. PATENT DOCUMENTS

| 12,244,966 B2 * | 3/2025 | Lin | H04N 7/15 |
| 12,477,020 B1 * | 11/2025 | Paiuk | H04L 65/1093 |
| 2007/0115356 A1 * | 5/2007 | Kang | G08B 13/19686 |
| | | | 340/506 |
| 2008/0297586 A1 | 12/2008 | Kurtz et al. | |
| 2009/0015670 A1 * | 1/2009 | Gopinath | G08B 13/19686 |
| | | | 348/143 |
| 2015/0350351 A1 * | 12/2015 | Tung | H04W 4/21 |
| | | | 709/204 |
| 2016/0302034 A1 * | 10/2016 | Sophinos | H04W 4/021 |
| 2016/0371436 A1 * | 12/2016 | Eslava | G16H 10/60 |
| 2017/0126630 A1 * | 5/2017 | Ekambaram | H04L 63/102 |
| 2019/0197254 A1 * | 6/2019 | Salgar | G08B 13/19686 |
| 2020/0404221 A1 * | 12/2020 | Trundle | G06V 20/52 |
| 2021/0006835 A1 * | 1/2021 | Slattery | G06T 5/60 |
| 2021/0152802 A1 | 5/2021 | Varekamp et al. | |
| 2021/0297629 A1 * | 9/2021 | Lemes da Silva | G06F 18/214 |
| 2022/0164560 A1 * | 5/2022 | Heyman-Dewitte | |
| | | | G06K 7/1452 |
| 2023/0196684 A1 * | 6/2023 | Li | G06T 15/506 |
| | | | 345/419 |
| 2024/0064266 A1 * | 2/2024 | Hosangadi | H04N 5/272 |
| 2024/0119682 A1 * | 4/2024 | Rudman | G06T 19/006 |

OTHER PUBLICATIONS

International Search Report and Written Opinion on PCT App. PCT/CA2023/050490 dated Jul. 6, 2023 (9 pages).

\* cited by examiner

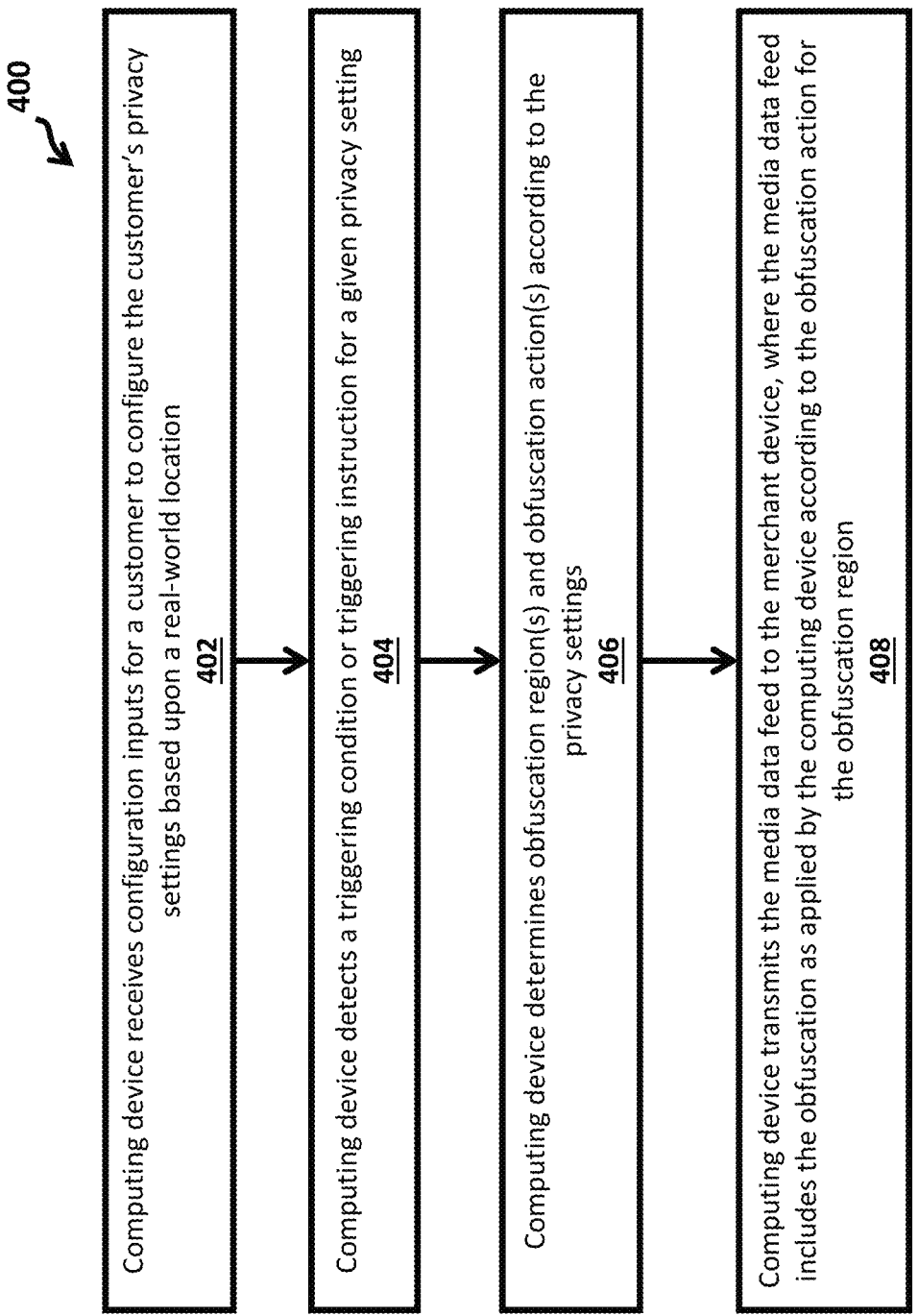

400

Computing device receives configuration inputs for a customer to configure the customer's privacy settings based upon a real-world location
402

Computing device detects a triggering condition or triggering instruction for a given privacy setting
404

Computing device determines obfuscation region(s) and obfuscation action(s) according to the privacy settings
406

Computing device transmits the media data feed to the merchant device, where the media data feed includes the obfuscation as applied by the computing device according to the obfuscation action for the obfuscation region
408

FIG. 4

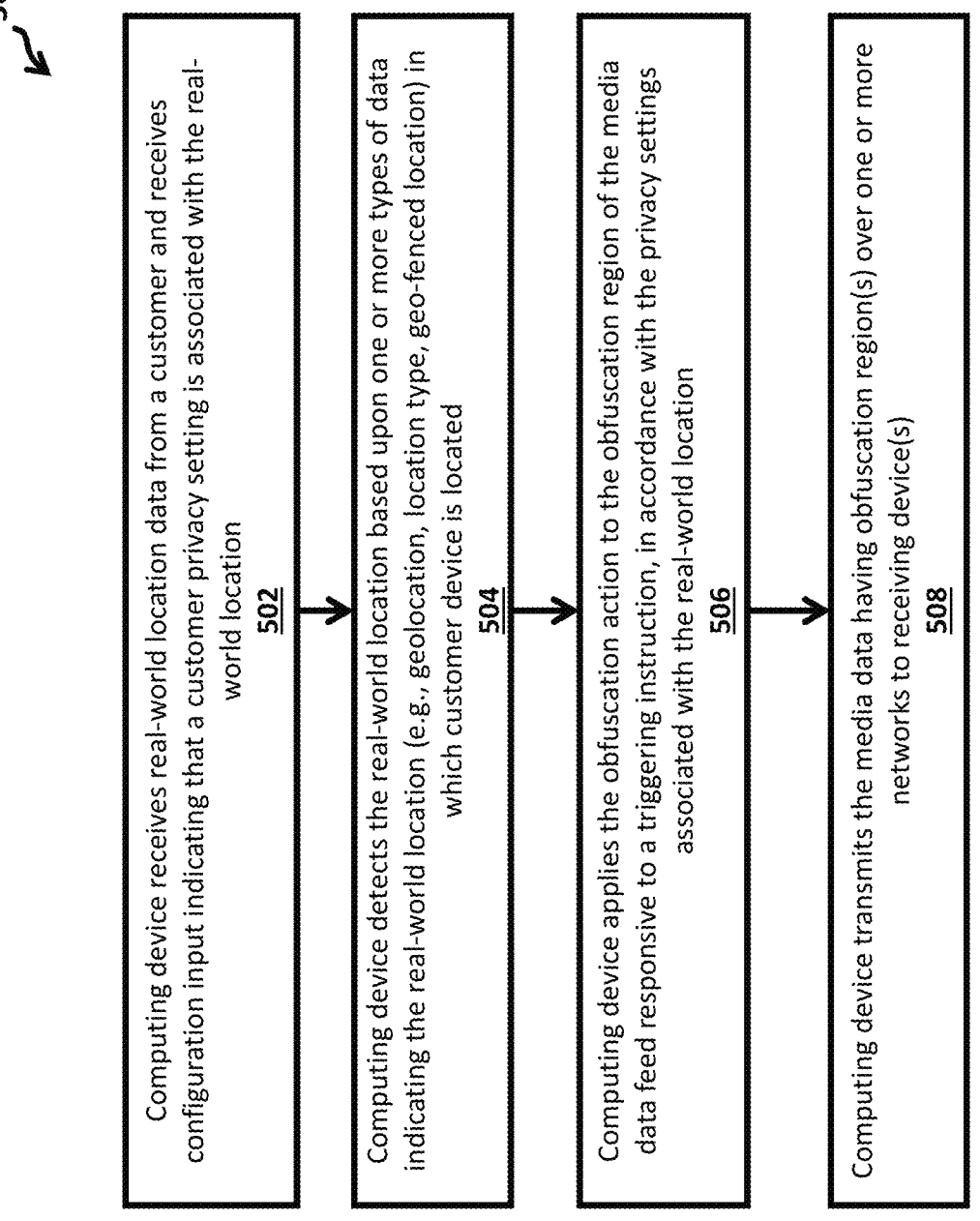

500

Computing device receives real-world location data from a customer and receives configuration input indicating that a customer privacy setting is associated with the real-world location
502

Computing device detects the real-world location based upon one or more types of data indicating the real-world location (e.g., geolocation, location type, geo-fenced location) in which customer device is located
504

Computing device applies the obfuscation action to the obfuscation region of the media data feed responsive to a triggering instruction, in accordance with the privacy settings associated with the real-world location
506

Computing device transmits the media data having obfuscation region(s) over one or more networks to receiving device(s)
508

VOLUMETRIC PERMISSIONING

TECHNICAL FIELD

This application relates generally to dynamically generating of media data feeds and presenting graphical user interfaces, and, more particularly, to identifying obfuscating portions of media data according to user privacy settings prior to transmitting the media data.

BACKGROUND

Communications applications (sometimes called "apps") permit users to communicate using various formats or types of media. The various types of media data may be collected in a variety of settings such as, for example, when executing video communications apps (e.g., Zoom®, Houseparty®, Discord®), executing augmented reality (AR) functions, live streaming, and video casting, among others.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 4 shows steps of a method for configuring customer privacy settings associated with a given real-world location and applying obfuscations to a media feed in accordance with the customer privacy settings, according to an embodiment.

FIG. 5 shows steps of a method for determining customer privacy settings associated with a real-world location to be applied in given circumstance and applying the customer privacy settings and obfuscations to a media feed in accordance with the customer privacy settings, according to an embodiment.

DETAILED DESCRIPTION

Figure 1:
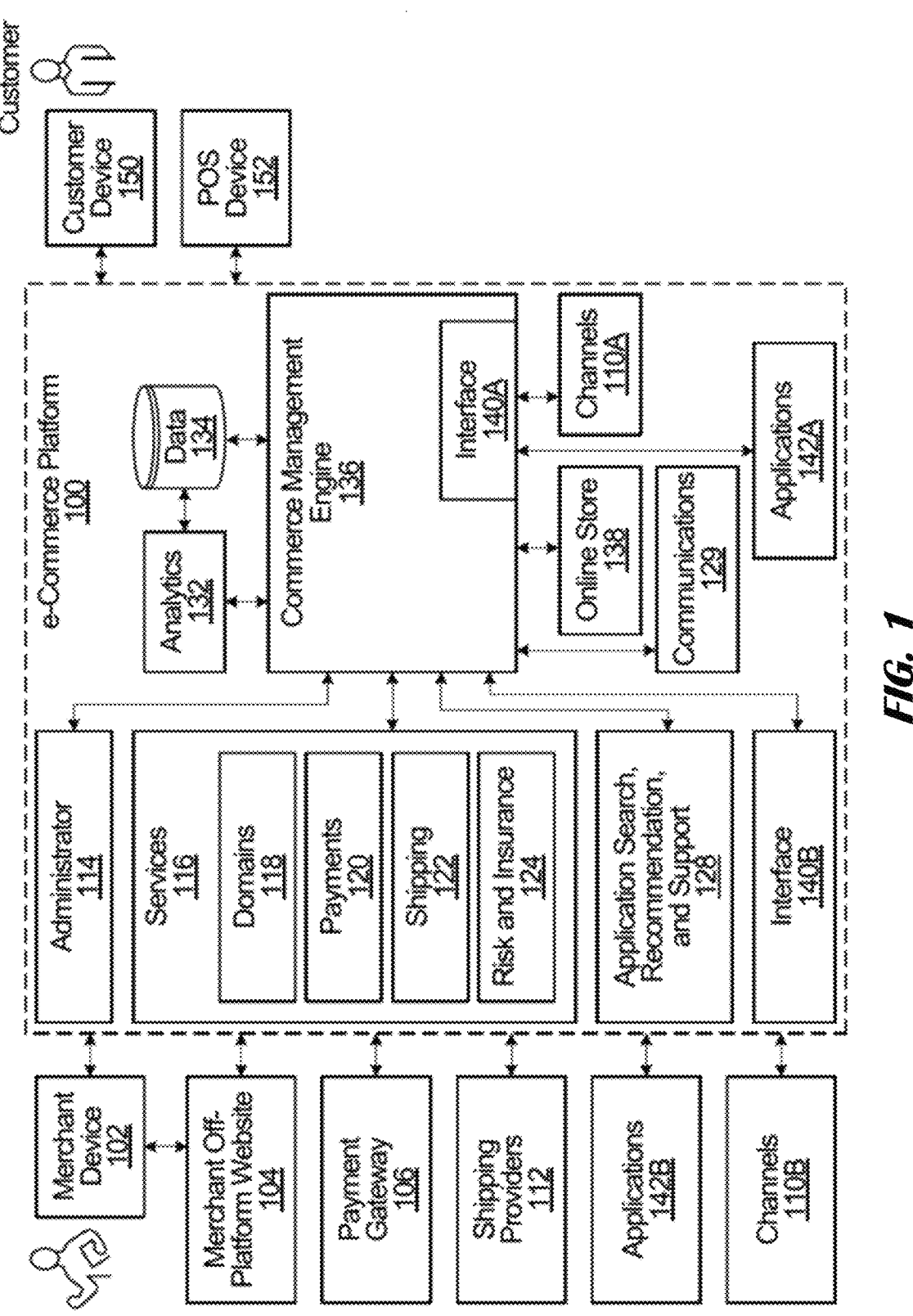
FIG. 1 illustrates an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Computer-generated media data (e.g., video, still images, series of still images) and media communication applications (apps) do not include location-specific privacy settings. A user may also desire to have the media communication apps or cloud services access media data, such as live media stream (e.g., video stream of image frames, series of still images) or 3D data (e.g., interior of a house) or prevent access to certain portions of the video stream or 3D data (e.g., user's bathroom). When using a dressing room, the user may also want to limit viewing access to only the bodily portion related to clothes considered for purchase. A problem is that media communication apps often do not include configurations related to certain privacy settings, such as location-specific privacy permissions. Permissions may include the scope of the types of media data (e.g., video data, image data) accessible to other users or the host platform as configured by the user. The permissions may also indicate the conditions (e.g., timing, types of other users) on which the other users or host platform may access the media data. For instance, the permissions may indicate whether another user may access an ongoing media stream (e.g., video stream). The permissions need not limit access to an entire media stream. Rather, the permissions may indicate which portions of the media stream could be obfuscated from the other user's view, such as private area behind the user (e.g., camera capturing image of user's bathroom from the user's living room).

Additionally or alternatively, the permissions may control access to 3D data related to virtual representations or "models" of the user's private spaces. The virtual representations may be used to establish an understanding or "recognize" attributes of the user's space in the camera, enabling the user to then establish permission configurations related to those privacy spaces.

Described herein are systems and methods for location-based privacy settings for generating and transmitting media data. Embodiments may generate, store, and reference location-based privacy settings that include computer-generated or user gesture-generated obfuscation regions that instruct the user computing device to apply an obfuscation to portions of the video feed. The computing device may be configured to recognize certain objects or regions (or portions thereof) and remove, blur, or substitute them from the live video stream or 3D data according to privacy settings. The privacy settings may be relative to the location in which the user and computing device are situated. In operation, the computing device may determine the location and then apply the location-specific privacy settings to obfuscate a portion of the video feed while being generated and transmitted.

The computing device may determine the location and use the location to identify and apply one or more privacy settings. Examples of data for determining the location may include geolocation data (e.g., GPS data, lat-long, cell towers, WiFi hotspot) or wireless beacon data. A machine-learning architecture (e.g., layers defining an object recognition engine to identify objects/people situated in view to predict a location) may determine the location or recognize objects associated with a location, among other types of data indicative of the computing device's location. The real-world location may be an absolute location for particular geolocation information or relative location based upon location data that indicate the real-world location or type of real-world location to the computing device. For example, the computing device may receive wireless beacon signals that may indicate instructions for geo-fencing a type of real-world location (e.g., restroom or dressing room). The real-world locations may include various types of localities defined by physical spaces (e.g., house, office building) or sub-spaces of the physical space (e.g., living, kitchen, bathroom, office).

The real-world location may be a relative location, an absolute location, and/or a type of location, based upon the type of data used for determining the location of the computing device. For example, the computing device may determine the absolute location (e.g., lat-long, city, state, country) using the geolocation data. As another example, the computing device may determine a relative location (e.g., situated within a geo-fenced region) using the geolocation data or the beacon data. As another example, the computing device may determine a type of location (e.g., living room, dressing room) using beacon data defining a geo-fence. The computing device may execute an object recognition engine of a machine-learning architecture that recognizes one or more objects (e.g., couch, TV). As another example, the computing device may execute the object recognition engine to identifies one or more objects or types of an object in the image data of the physical space of the real-world location. The computing device may predict the real-world location or type of real-world location if an amount of recognized objects or recognized types of objects satisfy one or more prediction thresholds for predicting a particular real-world location or type of real-world location.

The computing device (or a device of a commerce platform) may use the identified real-world location to determine whether any privacy settings are associated with the real-world location. The computing device then applies the pre-configured privacy settings, which may instruct the computing device to prompt the user to input preferred privacy settings. The privacy settings may be stored in the computing device, a database of the commerce platform, or stored and communicated to the computing device by another device (e.g., wireless beacon). The privacy settings instruct the computing device on obfuscating certain portions of a video feed generated by the computing device and one or more optical sensors of the computing device.

The optical sensors (e.g., camera, LIDAR) of the computing device may capture and generate image data within a field of view of the optical sensors. The computing device may then translate the image data into the video feed, which the computing device may then stream via one or more networks. Based on the one or more privacy settings for the particular real-world location, the computing device may determine an obfuscation region within the image data generated and received from the optical sensors. The computing device may then apply an obfuscation to a portion or all of the translated video feed prior to streaming the video feed.

The privacy setting may indicate the obfuscation region and/or the type of obfuscation to apply to the video feed. The user may preconfigure and store the obfuscation region for the particular real-world location, or the user may configure or adjust the obfuscation region in real-time. The user may provide user inputs that define the obfuscation region via a user interface displaying a preview of the video feed. Additionally or alternatively, the computing device may automatically identify the need for the obfuscation region based upon object recognition data or preconfigured labelled data (sometimes referred to as tags) for the real-world location.

The obfuscation region may be a set of coordinates in 2D or 3D space for the real-world location and captured within the field of view of the one or more optical sensors (e.g., a restroom door or a region covering clutter in a room), whereby the obfuscation region functions as a "privacy curtain" within the video feed. In one example, the user and/or the object recognition engine may generate the set of coordinates that defines the obfuscation region by recognizing the user's body or body parts (e.g., hands, head) and following the motion of the user's body.

The obfuscation region may be the set of coordinates that are generated according to user motion, whereby the user "paints" (e.g., by selecting an area, such as with a touchscreen, gestures, or other input) the obfuscation region where the user desires privacy. As the user moves their hands through the air, the computing device generates the obfuscation region as a "privacy paint" applied to the corresponding portions of the video feed according to the user's motions.

The obfuscation region may persist within the 3D physical space of the real-world location during runtime of the ongoing video stream, unless the user deletes, adjusts, or removes the obfuscation region. The computing device maintains contextual awareness of the set of coordinates of the obfuscation region relative to the 3D physical space of the real-world location. In this way, even when the optical sensors may be pointed in a direction that does not capture the obfuscation region, the computing device may still maintain awareness of the obfuscation region for when the camera is eventually redirected towards the obfuscation region.

The privacy settings may indicate a type of obfuscation applied to the video feed (sometimes referred to as the obfuscation action). Examples of the types of obfuscation may include blurring the image data, replacing the image data with certain image data (e.g., virtual body or clothing), excluding the image data from the video, turning off one or more optical sensors, and halting the video feed, among others. When generating the video feed using the image data, the computing device applies the type of obfuscation to the portions of the video feed corresponding to the obfuscation region or cuts the video feed.

In some implementations, the type of obfuscation includes dynamically turning off one or more optical sensors or halting the video feed when the user traverses the set of coordinates defining the privacy curtain. The computing device may recognize and track the user's motions in the 3D physical space of the real-world location. When the computing device determines that the user traversed through the privacy curtain (away from the computing device), the computing device may automatically cut the video (or apply any number of obfuscations). Likewise, the computing may automatically enable the video (or halt the obfuscations) when the user traverses back through the privacy curtain (toward the computing device).

Example E-Commerce Platform

In some embodiments, the methods disclosed herein may be performed on or in association with a commerce platform, such as an e-commerce platform 100. Therefore, an example of a commerce platform will be described by way of introduction. However, it should be understood that the e-commerce platform 100 is only one possible example of an online platform and is not intended to be limiting. Another example in the context of a computing device is also described. In that manner, the present disclosure may be implemented in other contexts, and is not necessarily limited to implementation in an e-commerce platform 100 or a user device.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors, which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like.

However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-

B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
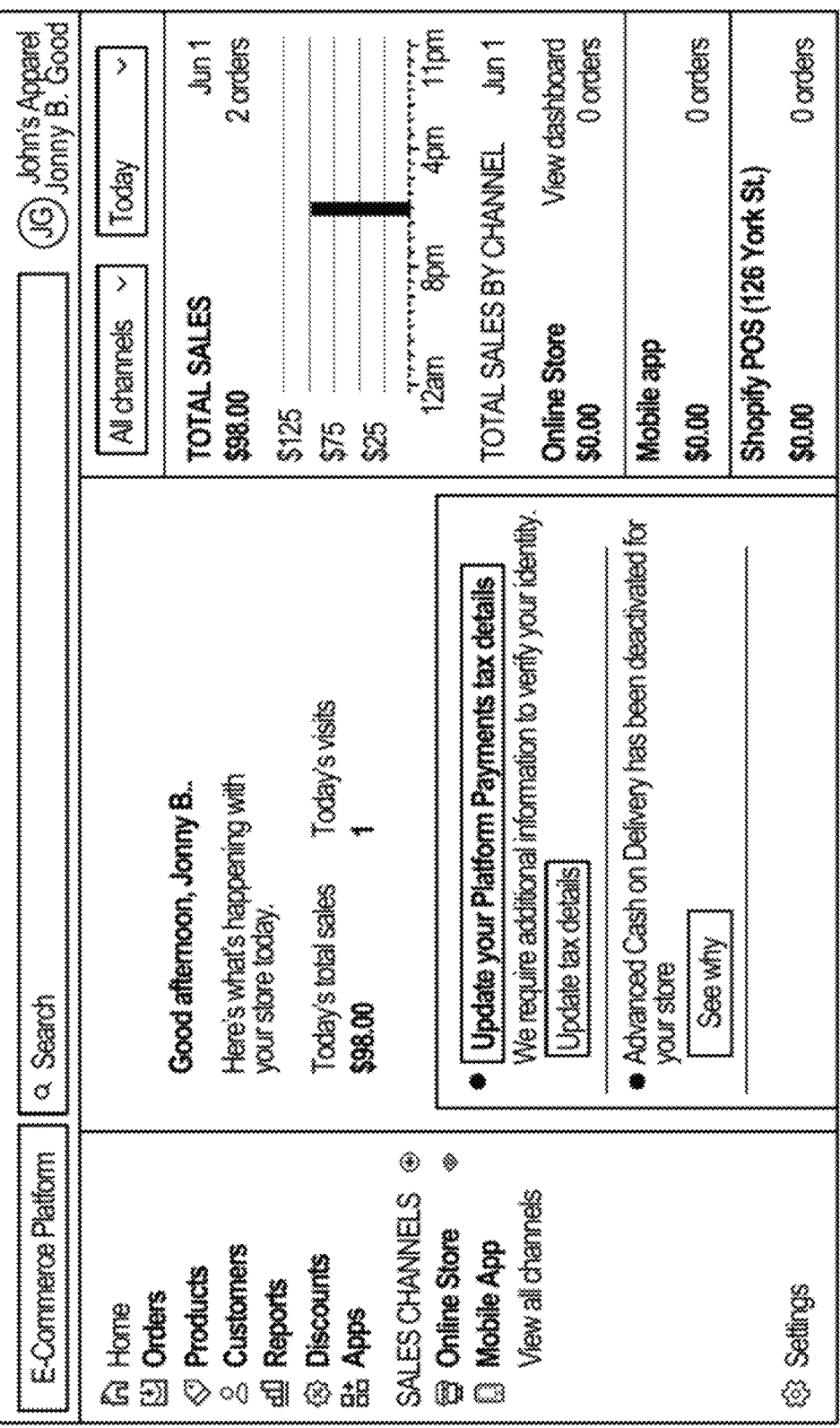
FIG. 2 depicts a home page of an administrator, according to an embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports, and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if the customer has never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine

136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information, such as an email address, billing information, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10," and entitlements may be items such as "a 20% discount on the whole order" or "$10 off products X, Y, and Z."

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method that requires the merchant to wait to make sure they will receive their funds, and the like. Risks and recommendations may be persisted in an order risk model.

Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Example Networked Components of System

Figure 3:
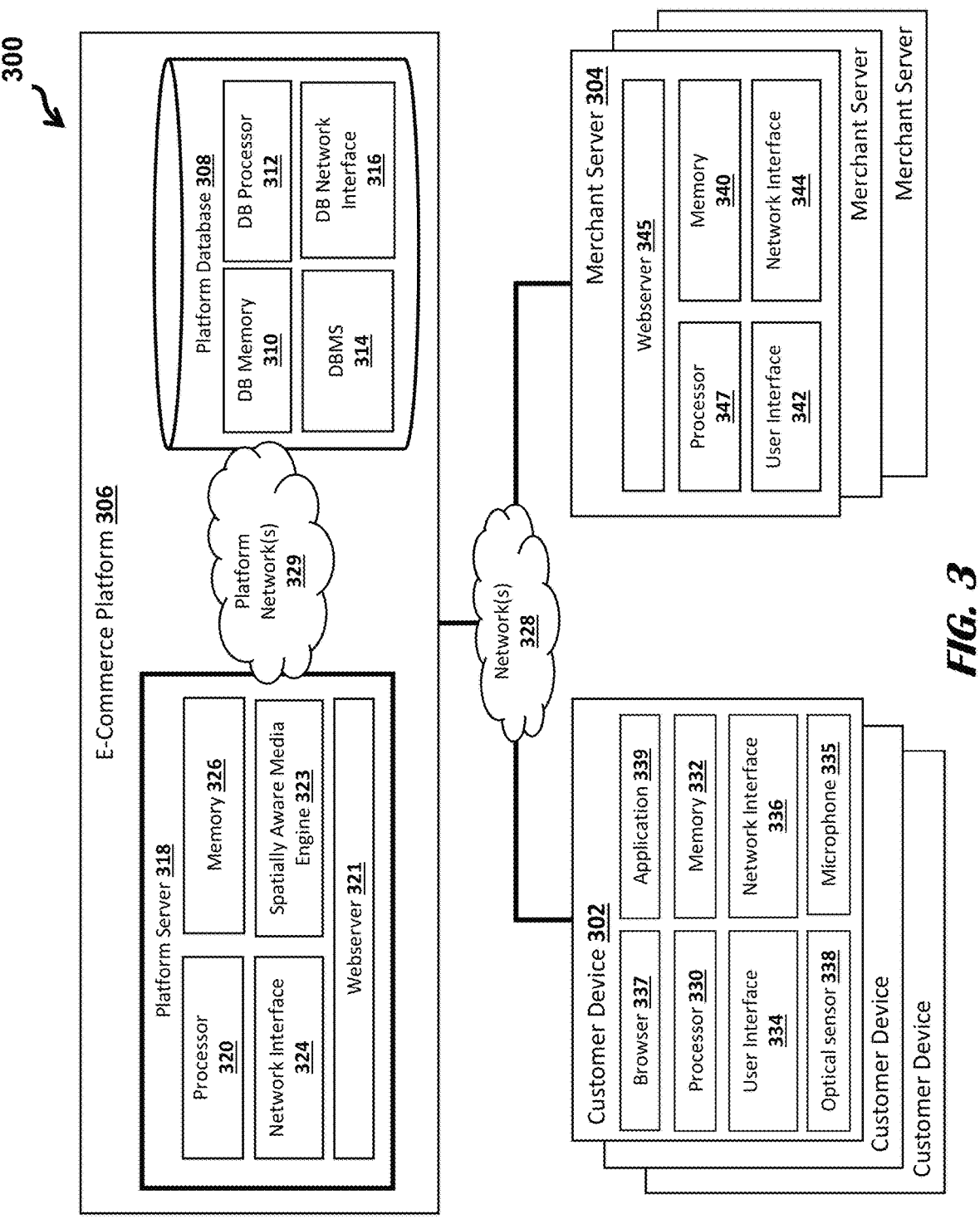
FIG. 3 illustrates components of a system offering dynamic product presentation, according to an embodiment.

FIG. 3 illustrates components of a system 300 offering dynamic product presentation, according to an embodiment. The system 300 includes various hardware and software components including customer devices 302, merchant servers 304, and computing devices of an e-commerce platform 306. The customer devices 302, the merchant servers 304, and the e-commerce platform 306 interconnect and may communicate with one another via a network 328. For ease of description and understanding of an example, FIG. 3 depicts the system 300 as having only one or just a few of each component. However, embodiments may include any number of the components described herein. Moreover, embodiments may comprise additional or alternative components, or may omit certain components, and still fall within the scope of this disclosure. It should be understood that the e-commerce platform 300 is only one possible example of an online platform and is not intended to be limiting. The present disclosure may be implemented in other contexts, and is not necessarily limited to implementation in an e-commerce platform 300, customer device 302, and merchant servers 304, but may include any type of computing devices hosting cloud-based data-transaction services, any type of end-user devices, and any type of devices hosting third-party services.

The network 328 may include any number of public and/or private networks. The network 328 may comprise hardware and software components implementing various network and/or telecommunications protocols facilitating communications between various devices, which may include devices of the system 300 or any number of additional or alternative devices not shown in FIG. 3. The network 328 may be implemented as a cellular network, a Wi-Fi network, or other wired local area networks (LAN) or wireless LAN, a WiMAX network, or other wireless or wired wide area network (WAN), and the like. The network 328 may also communicate with external servers of other external services coupled to the network 328, such the merchant server 304 or servers hosting a social media platform, a banking platform, a fashion or design service platform, a teleconferencing platform, or other types of cloud-based platform services.

The network 328 may include any number of security devices or logical arrangements (e.g., firewalls, proxy servers, DMZs) to monitor or otherwise manage web traffic to the e-commerce platform 306. Security devices may be configured to analyze, accept, or reject incoming web requests from the customer device 302, the merchant server 304, and/or the customer device 302. In some embodiments, the security device may be a physical device (e.g., a firewall). Additionally or alternatively, the security device may be a software application (e.g., Web Application Firewall (WAF)) that is hosted on, or otherwise integrated into, another computing device of the system 300. The security devices monitoring web traffic are associated with and administered by the e-commerce platform 306.

The customer device 302 may be any electronic device comprising hardware and software components capable of performing the various tasks and processes described herein. Non-limiting examples of the customer device 302 may include mobile phones, tablets, laptops, and personal computers, among others. The customer device 302 may be a mobile phone, tablet, gaming console, laptop, or computer, owned and/or used by the customer. The customer device 302 may include a customer processor 330, customer memory 332, customer graphical user interface 334, and customer network interface 336. The customer device 302 may execute a browser 337 and/or client-side software application 339 to access services of the e-commerce platform 306 or the merchant server 304.

The customer device 302 may comprise (or otherwise connect to) one or more optical sensors 338 and a microphone 335, which may generate various types of media data (e.g., audio data, video data, audiovisual data). The customer user interface 334, optical sensor 338, and microphone 335 need not be integrated components of the customer device 302. For instance, in some embodiments the customer device 302 may receive the media data from external devices (e.g., optical sensor 338 connected to the customer device 302 via a USB interface and cable) or from other computing devices of the system 300 via the network 328.

The optical sensors 338 may include any type of sensor device that generates optical or image media data for the customer device 302 by converting light rays into electronic signals and binary data. Non-limiting examples of the optical sensors 338 may include a camera, LIDAR sensor, and a light sensor, among others.

The customer processor 330 directly performs or instructs all of the operations performed by the customer device 302, which the customer processor 330 may accomplish in some embodiments according to instructions and control from an operating system of the customer device 302. Non-limiting examples of these operations include: processing customer inputs received from the customer user interface 334; processing media data captured by the camera (or other optical sensor 338) or the microphone 335; preparing information for transmission over the network 328; processing data or instructions received over the network 328 from other devices of the system 300; and instructing a display screen to display information, among others. The customer processor 330 may be implemented by one or more processor devices that execute instructions stored in the customer memory 332. Alternatively, some or all of the customer processor 330 may be implemented using dedicated circuitry, such as an ASIC, a GPU, or a programmed FPGA.

The network interface 336 may include hardware and software enabling the customer device 302 to communicate via the network 328. The structure of the network interface 336 will depend on how the customer device 302 interfaces with the network 328. For example, if the customer device 302 is a mobile phone or tablet, the network interface 336 may include a transmitter, receiver, or transceiver with an antenna for sending and receiving wireless transmissions to or from the e-commerce platform 306 or merchant server 304 via the network 328. The customer device 302 may connect physically to the network 328 via a network cable or other interfacing hardware components compatible with the network interface 336. The network interface 336 may include, for example, a network interface card (NIC), a computer port, and/or a network socket. The customer device 302 may include any number of network interfaces 336 for communicating via different channel mediums and protocols. For example, the customer device 302 may include hardware and software for communicating TCP/IP data packets with computing devices of the system 300 via wired LANs or wireless LANs; and may further include hardware and software for wirelessly communicating Bluetooth® data packets with other computing devices, such as wireless beacons (not shown).

When communicating with components of the e-commerce platform 306, the customer device 302 may generate web traffic (or web session data) that is processed by or otherwise accessible to the platform server 318 of the e-commerce platform 306. The web traffic may comprise data packets that include various types of data that can be parsed, analyzed, or otherwise reviewed by various programmatic algorithms of the platform server 318. For instance, the web traffic data may indicate which electronic content was accessed by a customer operating the customer device 302. In an example, a customer operating the customer device 302 accesses a merchant's online store by either visiting a website of the merchant hosted by the merchant server 304 using the browser 337 or executing the application 339. The merchant's online store may include one or more features hosted (or otherwise produced or functionally controlled) by the platform server 318. For instance, the platform server 318 may revise one or more features displayed on the merchant's online store. The browser 337 and/or the application 339 may transmit and receive data packets to display various features of the merchant's online store on a graphical user interface 334.

The browser 337 may include a software program (e.g., Google Chrome®, Microsoft Internet Explorer®) executed by the customer device 302 for accessing a website or cloud-application hosted by the platform webserver 321 or merchant webserver 345. The browser 337 navigates to the platform webserver 321 or merchant webserver 345 according to a Uniform Resource Locator (URL) or other type of addressing identifier, accesses machine-readable code (e.g., html, php, javascript) of the webpage, and executes machine-readable instructions according to the webpage code. For instance, the webpage code may instruct the browser 337 to generate and display elements of the webpage as an interactive graphical user interface, which may be displayed via the customer user interface 334. An example of the customer user interface 334 may include the visual elements of the webpage and/or a physical display screen (e.g., touchscreen) of the customer device 302. By operating the browser 337, the customer may navigate the webpages hosted by the platform webserver 321 or merchant webserver 345 to interact with, and configure, the services or products offered by the e-commerce platform 306 or the merchant's online services.

The application 339 may include a software program published by or otherwise associated with the e-commerce platform 306 or the merchant's online service, and installed on the customer memory 332 of the customer device 302. The customer processor 330 of the customer device 302 may execute the application 339, which remotely accesses the data and/or functional services hosted by the platform server 318 or the merchant server 304, such as a cloud-based software application. The application 339 transmits requests or instructions to the platform server 318 or merchant server 304 as the user operates the application 339. Using the data or instructions received from the platform server 318 or merchant server 304, the application 339 may generate and display elements of an interactive graphical user interface within the application 339, which the application 339 instructs the customer device 302 to display as the customer user interface 334. By operating the application 339, the customer may access the cloud-application hosted by the platform webserver 321 or merchant webserver 345, to interact with, and configure, the services or products offered by the e-commerce platform 306 or the merchant's online services.

In operation, the browser 337 or the application 339 may connect a receiving device of the system 300 intended as a destination for a media feed. The optical sensor 338 and/or the microphone 335 of the customer device 302 generate media data including various types of machine-readable media data elements (e.g., image feed, audio feed, video feed), and the customer processor 330 provides the media data to the browser 337 or the application 339, which instructs the customer device 302 to transmit the media data as a media feed or as discrete files, to the receiving device (e.g., platform server 318, merchant server 304).

In some instances, the platform server 318 or customer device 302 may execute a spatially aware media engine 323 or similar software programming that analyzes the media data of the physical space of the real-world location to identify or generate visual attributes. The spatially aware media engine 323 may, for example, generate a 3D coordinate system for the physical space of the real-world location and recognize visual attributes. Non-limiting examples of the visual attributes generated or recognized by the platform server 318 may include contours, surfaces, barriers defining dimensions of the physical space, and objects situated in the physical space. An object recognition engine executed by the platform server 318 or the customer device 302 may predict the physical space captured by the optical sensor 338 based upon the objects or types of objects recognized in the media data.

In some embodiments, the platform server 318 or customer device 302 may execute software programming (e.g., media engine 323, application 339) that apply various machine-learning architectures on the media data to generate an augmented reality (AR) representation of the physical space of the real-world location. The platform server 318 may generate a 3D coordinate system using the various types of media data received from the optical sensor 338 and/or user inputs. The platform server 318 may generate 3D coordinates for recognized objects or obfuscations that map the recognized objects or obfuscations to the 3D coordinate system generated for the real-world location. The spatially aware media engine 323 of the platform server 318 or the customer device 302 may pin or anchor obfuscations to coordinates of objects or user-inputted coordinates such that the obfuscations remain dynamic, even if the pinned object moves, and may persist, even when the obfuscation is not captured by a current field-of-view of the optical sensors 338.

Using the browser 337 or the application 339, the customer may enter configurations into the customer user interface 334 that configure the functions and services provided by the e-commerce platform 306, the merchant online store, and/or the application 339. The customer device 302 may store for the application 339 or transmit the configurations to the platform server 318 or merchant server 304. The configuration inputs indicate customer preferences and include instructions for configuring the customer's experience for the services provided by the e-commerce platform 306 or the merchant's online service, and/or configuring the operations of devices and software components of the system 300. The configuration inputs may include privacy configuration inputs that contain or indicate various customer privacy settings. Non-limiting examples of the privacy settings include a real-world location associated with the privacy settings, a recipient or receiving device associated with the privacy settings, one or more triggering conditions or instructions, an obfuscation region within the media data, and an obfuscation action, among others.

The privacy settings may be stored into the platform database 308 or the customer memory 332 and accessed by the software (e.g., media engine 323, privacy settings engine 322, application 339, browser 337) when generating or transmitting media data from the customer device 302 to a particular receiving device (e.g., merchant server 304). In some cases, the customer may enter the privacy settings at any time prior to generating and transmitting the media data to the recipient. In this way, the customer may preconfigure the privacy settings. In some cases, the customer may enter new or updated privacy settings on the fly, at the time of or contemporaneous to generating and transmitting the media data. In this way, the customer need not preconfigure any or all of the privacy settings associated with the real-world location. The customer may provide new or updated privacy settings while the customer is operating the customer device 302 to transmit the media feed, from the customer device 302 to the merchant server 304 (or other receiving device).

In operation, an operating system of the customer device 302 may provide media data captured by the optical sensor 338 and/or microphone 335 of the customer device 302 to the browser 337, thereby allowing the browser 337 to generate and transmit a media stream to a receiving device, such as the platform server 318, merchant server 304, and/or one or more customer devices 302. One or more devices of the system 300 may apply obfuscations to portions of the media data in accordance with the customer's privacy settings.

The customer may operate the customer device 302 to establish the customer's privacy settings within the e-commerce platform 306 for real-world locations. The customer or other end-user (e.g., merchant) may operate the browser 337 or the application 339 to enter various configuration inputs into the customer user interface 334. The configuration inputs may instruct the customer device 302 to perform certain operations for establishing privacy configurations on behalf of the customer within the system 300, amongst the devices associated with the e-commerce platform 306. In some cases, the customer device 302 may upload or otherwise transmit the configuration inputs to the platform server 318 and/or to the merchant server 304. In some cases, the customer device 302 may update the local privacy settings of the application 339 according to the configuration inputs.

The configuration inputs may include an indication of, for example, the particular real-world location associated with the new or updated privacy setting(s), a triggering-instruction for applying the privacy settings for the real-world location, an obfuscation region within the video feed (or other media) generated by the customer device 302, and one or more obfuscation actions for the customer device 302 or other device of the system 300 to perform for obfuscating the obfuscation region.

In some embodiments, the application 339 of the customer device 302 executes the augmented reality (AR) software programming that generates the augmented AR-enriched media data feed transmitted to the merchant server 304 or other receiving device or presented to the customer via the graphical user interface 334. For the AR operations, the customer device 302 may activate the optical sensor 338 to generate the ongoing video feed from the optical sensor 338, which the customer device 302 augments to include virtualized overlays having the obfuscation regions within the video feed data, according to the privacy settings for the real-world location. For instance, the graphical user interface 334 or merchant user interface 342 may present the video feed of the customer's physical space (e.g., living room) with an overlay of an obfuscation region (sometimes referred to as a privacy curtain or privacy paint), as generated or retrieved by the customer device 302 executing the browser 337 or application 339. Optionally, the application 339 may receive still image data or stored video data, and generate the virtualized overlays on the still image or video data.

The overlays may include, for example, obfuscation regions generated according to the privacy settings for the customer. The privacy settings may include the obfuscation region(s) and obfuscation action(s). The obfuscation region may configure and indicate the portion of the visual data that the customer would like to obfuscate from view at the receiving device (e.g., merchant server 304). The obfuscation region may be defined by, for example, a set of coordinates in a coordinate system the customer device 302 or the platform server 318 generated and mapped for the physical space. Additionally or alternatively, the customer device 302 or platform server 318 may pin or anchor the obfuscation region within the coordinate system, such that the coordinates may be relative to a certain portion or attribute (e.g., object or surface) that the machine-learning architecture recognized in the visual image data captured by the optical sensor 338. For instance, the customer device 302 or platform server 318 may pin or anchor the obfuscation region to a set of relative coordinates or an object (e.g., a desk) recognized in the coordinate system of the physical space. As the optical sensor 338 moves around the physical space and changes perspective, the obfuscation region may remain pinned to the particular set of relative coordinates or the object (e.g., desk) within the media feed, thereby maintaining the obfuscation presented to the merchant user interface 342, and remains persistent even when the customer redirects the optical sensor 338 point-of-view away from the obfuscation region pinned to stationary furniture. In some cases, by pinning or anchoring the obfuscation region to a movable object or person, as the person or object moves around the physical space, the obfuscation region may remain pinned to the particular person or object within the media feed, thereby maintaining the obfuscation presented to the merchant user interface 342. In this way, the AR overlays for the obfuscation region may be relative or absolute to the coordinate system of the physical space; additionally or alternatively, the AR overlays for the obfuscation region may be dynamic or fixed (stationary) within the coordinate system of the physical space.

In some cases, the privacy settings may include the obfuscation region indicating the portion or section region of the video feed where the customer device 302 places the obfuscation in the visual media data. In some cases, the privacy settings may include one or more obfuscation actions. As an example, the obfuscation region may indicate a set of coordinates corresponding to a set of coordinates of a portion of the visual media data defining the secret region that the customer wishes to obfuscate by applying the obfuscation region. In some implementations, the obfuscation region may be defined by the set of 3D coordinates that the customer device 302 or platform server 318 mapped to the 3D coordinate system generated for the physical space by the platform server 318 or customer device 302. The customer device 302 may determine the set of coordinates for the obfuscation region and apply the obfuscation region to the visual media data according to the set of coordinates stored in the privacy settings or received via the customer user interface 334.

The privacy settings may include the obfuscation action that indicates the character or manner in which the customer device 302 applies or otherwise implements the obfuscation. The obfuscation action may instruct the customer device 302 to perform a certain action for applying the obfuscation to the coordinates of the obfuscation region. Non-limiting examples of the obfuscation actions for applying the obfuscation to a portion of the video feed, as indicated by the obfuscation region, may include: blurring the portion of the video feed, excluding or nullifying image data for the portion of the video feed, or replacing the portion of the video with replacement image data stored in the customer device 302 or platform database 308 for the portion of video feed, among others. In some cases, the privacy settings may include a triggering instruction for the customer device 302 that automatically or responsively instructs the customer device 302 to perform certain actions when the customer device 302 or other device detects a triggering condition associated with the triggering instruction.

The e-commerce platform 306 is a computing system infrastructure that may be owned and/or managed (e.g., hosted) by an e-commerce service and, in some embodiments, may be the same as or similar to that described with reference to FIGS. 1-2, though this need not be the case. The e-commerce platform 306 includes electronic hardware and software components capable of performing various processes, tasks, and functions of the e-commerce platform 306.

For instance, the computing infrastructure of the e-commerce platform 306 may comprise one or more platform networks 329 interconnecting the components of the e-commerce platform 306. The platform networks 329 may comprise one or more public and/or private networks and include any number of hardware and/or software components capable of hosting and managing the networked communication among devices of the e-commerce platform 306.

As depicted in FIG. 3, the components of the e-commerce platform 306 include the platform server 318 and platform database 308. However, the embodiments may include additional or alternative components capable of performing the operations described herein. In some implementations, certain components of the e-commerce platform 306 may be embodied in separate computing devices that are interconnected via one or more public and/or private internal networks (e.g., network 328, platform network 329). In some implementations, certain components of the e-commerce platform 306 may be integrated into a single device. For instance, the platform server 318 may host the platform database 308. Furthermore, the e-commerce platform 306 may include the platform server 318 configured to serve various functions of the e-commerce platform 306. Non-limiting examples of such functions may include the software functions of the platform webserver 321 hosting webpages and applications (or at least a portion of a webpage or cloud-application) on behalf of merchants (e.g., merchants' online stores), security servers executing various types of software for monitoring web traffic (e.g., determining that a customer has accessed an electronic platform hosted by the merchant server 304), and database servers hosting various platform databases 308 of the e-commerce platform 306, among others.

The illustrative e-commerce platform 306 is shown and described as having only one platform server 318 performing each of the various functions of the e-commerce service. For instance, the platform server 318 is described as serving the functions of executing a spatially aware media engine 323 and a web server hosting webpages for merchants' online stores and account administration. It is intended that FIG. 3 is merely illustrative and that embodiments are not limited to the description of the system 300 or the particular configuration shown in FIG. 3. The software and hardware of the platform server 318 may be integrated into a single distinct physical device (e.g., a single platform server 318) or may be distributed across multiple devices (e.g., multiple analytics servers 318). In some implementations, the platform server 318 may be a virtual machine (VM) that is virtualized and hosted on computing hardware configured to host any number of VMs. Some operations may be executed on a first computing device while other operations may be executed on a second computing device, such that the functions of the platform server 318 are distributed among the various computing devices. For instance, some operations may be executed on the customer device 302 and others may be executed by the platform server 318, such that the workload and functionality are distributed between or otherwise result from execution by various devices of the system 300.

The platform server 318 may be any computing device that comprises a processor 320 and non-transitory machine-readable storage media (e.g., server memory 326) and that is capable of executing the software for one or more functions such as the spatially aware media engine 323. Non-limiting examples of the platform server 318 may include desktop computers, laptop computers, and tablet devices, among others. In some cases, the server memory 326 may store or otherwise contain the computer-executable software instructions, such as instructions needed to execute the spatially aware media engine 323. The software and hardware components of the platform server 318 enable the platform server 318 to perform various operations that serve particular functions of the e-commerce platform 306. For example, the platform server 318 may execute webserver software (e.g., Apache®, Microsoft IIS®) enabling the platform server 318 to execute functions the platform webserver 321, such as hosting webpages of the e-commerce platform 306 allowing the customer or the merchants to register with the e-commerce platform 306 and establish various configurations (e.g., customer privacy settings, merchant online store configurations). As another example, the platform server 318 may cause the merchant's online store to interact with the customer devices 302 in accordance with the methods described herein, which may include updating privacy settings of the customers and/or applying certain obfuscation actions according to the customer's privacy settings.

The platform server 318 and/or client-side application 339 of the customer device 302 may execute a spatially aware media engine 323 that directly or indirectly generates media feed data, transmitted from the customer device 302 to the merchant server 304, which presents the media feed at a merchant user interface 342. The spatially aware media engine 323 may be executed by the platform server 318 and/or by the customer device 302 under the direction of the platform server 318, where some or all of the operations of the spatially aware media engine 323 may be performed locally on the customer device 302 or in the e-commerce platform 306. In some implementations, the spatially aware media engine 323 analyzes the image data of a physical space to, for example, generate a 3D coordinate system for the physical space, recognizes or fetches attributes (e.g., people, objects, surfaces, obfuscation regions) in the physical space, maps the attributes to the coordinate system, pins or anchors attributes to the coordinate system, and applies the obfuscation regions, among other potential functions. The spatially aware media engine 323 may generate and transmit instructions to application 339 for generating the AR-enriched media data having the obfuscation overlays according to the privacy settings. The customer device 302 may use these instructions to generate and transmit the media stream to the merchant server 304.

The platform server 318 may receive media data from the customer device 302, which the platform server 318 may process using various machine-learning architecture operations and then generate database records containing information for customer privacy settings, including real-world location information about the customer's physical spaces (e.g., rooms of the customer's house) and related privacy settings. For instance, the customer may operate the optical sensor 338 of customer device 302 to capture media data (e.g., image data, video data) of a physical space (e.g., living room) for a real-world location (e.g., customer's house, living room), and then instructs the customer device 302 to upload the media data to the e-commerce platform 306. The platform server 318 may perform various the processes that ingest the media data and apply the layers of a machine-learning architecture defining a computer vision and/or object recognition engine to identify attributes of the physical space and recognize objects.

In some implementations, the machine-learning architecture executed by the platform server 318 or customer device 302 may be trained to predict a type of real-world location or attribute of the real-world location. For example, platform server 318 may recognize a couch, TV, coffee table, and throw pillows in the visual data received for a particular physical space. The platform server 318 may predict that the physical space captured by the image data is likely a living room and may, additionally or alternatively, predict that the real-world location of the physical space is the customer's house or living room.

In some embodiments, the platform server 318 or customer device 302 may perform various software processes for processing the image data for physical spaces and/or generating AR-enriched media feed data. Such software processes may include the various layers of the machine-learning architecture for computer vision, object classification (e.g., object recognition engine), physical space classification (e.g., physical space recognition engine, real-world location recognition engine), and spatial awareness within the coordinate system of the physical space (e.g., spatially aware media engine 323). As an example, for a particular physical space, the platform server 318 may recognize attributes of the region, such as the dimensions, colors, and barriers (e.g., walls, half-walls, doorways, windows) the media data received from the customer device 302. In some implementations, the customer device 302 or the platform server 318 may generate the AR-enriched media data feed including the obfuscation regions based on the attributes and mapped coordinate system generated by the platform server 318. For instance, customer device 302 or platform server 318 may pin or anchor the obfuscation regions within the media feed using the attributes recognized by the platform server 318 in the physical space.

In some implementations, the application 339 may periodically prompt the customer to capture and upload updated media data for a real-world location at given time intervals or expiration thresholds, or in response to certain triggering events, such as detecting a transaction in which the customer purchases new furniture from a certain merchant registered with the e-commerce platform 306. In some implementations, the application 339 may automatically instruct the customer device 302 to generate (via the optical sensor 338) and/or upload updated image data for one or more physical spaces for the real-world location, at predetermined time intervals or in response to the optical sensor 338 of the customer device capturing new image data. The platform server 318 or customer device 302 may generate updated data for the physical space in the data records of the customer device, which may include updating the obfuscation regions in the physical space or instructing the customer device 302 to update the obfuscation regions in the physical space.

Additionally or alternatively, the spatially aware media engine 323 could be provided by the e-commerce platform 306 as a separate web-based or cloud-based service. In some implementations, the spatially aware media engine 323 may be partly or entirely executed by the customer device 302 and/or the merchant server 304. Other implementations of the spatially aware media engine 323 are also contemplated such as a stand-alone service to dynamically generate the instructions for generating the AR-enriched media data. While the spatially aware media engine 323 is shown as a single component of the e-commerce platform 306, the spatially aware media engine 323 could be provided by multiple different components that are in networked communication with the platform server 318 executing the spatially aware media engine 323.

Example embodiments and operations for generating and operating a 3D coordinate system for the physical space may be found in U.S. application Ser. Nos. 17/670,178 and 17/670,203, entitled "Augmented Reality Enabled Dynamic Product Presentation," filed Feb. 11, 2022, each of which is incorporated by reference in its entirety, and U.S. application Ser. No. 17/824,828, entitled "Augmented Reality Enabled Dynamic Product Presentation," filed May 25, 2022, which is incorporated by reference in its entirety.

The platform database 308 may store and manage data records concerning various aspects of the e-commerce platform 306, including information about, for example, actors (e.g., merchants, customers, or platform administrators), electronic devices, merchant offerings (e.g., products, inventory, or services), delivery methods, various metrics and statistics, machine-learning models, merchant pages hosting merchant stores, and other types of information related to the e-commerce platform 306 (e.g., usage and/or services).

The platform database 308 may store the media data received from the customer device 302 and the virtual environments into a database (DB) memory 310, within database records associated with the customer. In some cases, when the customer registers credentials with the services hosted by the e-commerce platform 306, the application 339 or browser 337 may prompt the new customer to capture and upload the media data, thereby allowing the e-commerce platform 306 to generate the one or more new virtual environments for the new customer in platform database 308. In some cases, the platform database 308 may store some or all of the customer's privacy settings in database records associated with the customer. The platform database 308 may be hosted on any number of computing devices having a processor (sometimes referred to as a DB processor 312) and non-transitory machine-readable memory configured to operate as a DB memory 310 and capable of performing the various processes and tasks described herein. For example, one or more analytics servers 318 may host some or all aspects of the platform database 308.

A computing device hosting the platform database 308 may include and execute database management system (DBMS 314) software, though a DBMS 314 is not required in every potential embodiment. The platform database 308 can be a single, integrated database structure or may be distributed into any number of database structures that are configured for some particular types of data needed by the e-commerce platform 306. For example, a first database could store customer credentials and be accessed for authentication purposes, and a second database could store raw or compiled machine-readable software code (e.g., HTML, JavaScript) for webpages such that the DB memory 310 is configured to store information for hosting webpages. The DB memory 310 of the platform database 308 may contain data records related to, for example, customer activity, and various information and metrics derived from web traffic involving customer accounts. The data may be accessible to the platform server 318. The platform server 318 may issue queries to the platform database 308 and data updates based upon, for example, successful or unsuccessful authentication sessions.

The computing device hosting the platform database 308 may further include a DB network interface 316 for communicating via platform networks of the e-commerce platform 306. The structure of the DB network interface 316 will depend on how the hardware of the platform database 308 interfaces with other components of the e-commerce platform 306. For example, the platform database 308 may be connected to the platform network with a network cable. The DB network interface 316 may include, for example, a NIC, a computer port, and/or a network socket. The processor 320 directly performs or instructs all of the operations performed by the platform database 308. Non-limiting examples of such operations may include processing queries or updates received from the platform server 318, customer device 302, and/or merchant server 304; preparing information for transmission via the platform network and/or the external networks. The processor 320 may be implemented by one or more processors that execute instructions stored in the DB memory 310 or other non-transitory storage medium. Alternatively, some or all of the DB processor 312 may be implemented using dedicated circuitry such as an ASIC, a GPU, or a programmed FPGA.

The platform database 308 may also include various libraries and data tables including detailed data needed to present products or objects via the merchant's online store and conduct transactions for the merchant's online store through the e-commerce platform 306. For instance, the platform server 318 may generate a data table associated with different products offered by different merchants and/or merchants' online stores.

Customer profile data stored in the platform database 308 and/or the customer memory 332 may include, for example, the privacy settings and the data for the customer's physical spaces, including the objects recognized in the physical spaces and/or obfuscation regions indicated by the privacy settings.

Merchant profile data stored in the platform database 308 may include, for example, the data for the products and services offered by the merchant. In some embodiments, the merchant profile data may include information about a real-world location operated by the merchant (e.g., brick-and-mortar store), including location data that may indicate the real-world location to the customer device 302 or the platform server 318. For instance, the location data in the merchant profile data may include the geo-location information (e.g., lat-long, mailing address), geo-fencing information, or other types of information that indicates the real-world location to the customer device 302. The merchant profile data may further indicate a type of real-world location or indicate certain privacy triggering instructions within the real-world location.

As an example, the merchant's physical store may include a sensitive physical space (e.g., dressing room). The merchant's physical store may further include one or more wireless beacons situated around the store, including within the dressing room. The wireless beacons may transmit information to the customer device 302 indicating that the customer (and customer device 302) entered the dressing room based on proximity to the beacons. In some cases, the beacon signals may expressly indicate that the real-world location is sensitive, and the customer device 302 may automatically prompt the customer to input the privacy settings or retrieve preconfigured privacy settings for the particular merchant's dressing room or for dressing rooms.

The merchant server 304 may be any server associated with a merchant hosting an online store. The merchant server 304 may be any computing device hosting a website (or any other electronic platform) accessible to customers (e.g., operating the customer device 302) via the network 328. The merchant server 304 may include a merchant processor 347 and non-transitory machine-readable storage (merchant memory 340) capable of executing various tasks described herein. The merchant processor 347 may include a computer-readable medium, such as a random access memory (RAM) coupled to the merchant processor 347. Non-limiting examples of the merchant processor 347 may include a microprocessor, an application-specific integrated circuit, and a field programmable object array, among others.

Non-limiting examples of the merchant server 304 may include workstation computers, laptop computers, server computers, laptop computers, and the like. While the system 300 includes a single merchant server 304, in some embodiments the merchant server 304 may include a number of computing devices operating in a distributed computing environment.

The merchant's online store may refer to any electronic platform that is directly or indirectly hosted by a merchant associated with the merchant server 304. For instance, the merchant's online store may be a website displayed on the browser 337 or the mobile application 339 of the customer device 302, and may be hosted (or otherwise functionally controlled) by the merchant server 304 and/or the platform server 318. In the embodiments where the merchant's online store is a web site, the customer operating the customer device 302 may execute the browser 337 (or other application) to connect the customer device 302 to (or otherwise access) the platform server 318 and/or the merchant server 304 using an IP Address obtained by translating a domain name of the web site. The platform server 318 and/or the merchant server 304 may execute code associated with the website and render the appropriate graphics to be presented to the graphical user interface 334. In embodiments where the merchant's online store is hosted on a cloud-based mobile application of the merchant or the e-commerce platform 306, the customer device 302 may execute an application 339 that is installed on the customer device 302. The customer device 302 and/or the application 339 may then execute the appropriate code to display features of the merchant's online store onto the graphical user interface 334.

The merchant server 304 may be configured to interact with one or more software modules of the same or different types depicted within the system 300. For instance, the merchant server 304 may execute software applications configured to host an electronic platform that may generate and serve various webpages to the customer device 302. The merchant server 304 may also display merchant user interfaces 342 generated by merchant server 304, customer device 302, or the platform server 318, where the merchant server 304 may receive the media data feed from the customer device 302 executing the browser 337 or application 339 to access the merchant server 304 and interact with the products or services of the merchant.

In some instances, the customer device 302 and the merchant server 304 may establish an interactive web-session in which the customer device 302 transmits the media feed to the merchant server 304. The merchant user interface 342 of the merchant server 304 may display the media data of the media feed to the merchant-user. Before merchant server 304 receives the media feed, the customer device 302 and/or the platform server 318 may execute any number of operations that apply one or more obfuscations to the media data captured by the optical sensor 338 of the customer device 302, in accordance with the privacy settings of the customer. The merchant server 304 may receive only the media data having the obfuscations applied to the original media data, thereby restricting the media data presented to the merchant via the merchant user interface 342 to only the video image having the obfuscated regions protecting the customer's privacy.

Example Processes

FIG. 4 shows steps of a method 400 for configuring end-user privacy settings associated with a given real-world location and applying obfuscations to a media feed in accordance with the end-user privacy settings. Embodiments may include additional, fewer, or different operations than those described in the method 400. For ease of description, a computing device performs the operations and steps of the method 400, though any number of computing devices or processors may perform the various operations described in FIG. 4 and steps of the method 400. As an example, the computing device may include any type of computing device (e.g., customer device 302) that performs the steps and operations of the method 400, such as a laptop, smartphone, tablet, personal computer, or server computer, among others. As another example, in some implementations, the computing device of the method 400 may include the computing device and one or more servers of a data-transaction platform service (e.g., platform server 318 of e-commerce platform 306), such that the end-user device and the servers may each perform certain operations or steps of the method 400. In another example, in some implementations, the computing device of the method 400 may include the one or more servers of the data-transaction provider platform that perform most or all of the functions and steps of the method 400, where the computing device performs few, if any, operations or steps of the method 400.

Optionally, in step 402, the computing device may receive one or more configuration inputs to preconfigure the end-user's privacy settings associated with a real-world location. The configuration inputs may include one or more indicators of the privacy settings, including an indicator of the real-world location associated with the privacy settings. The computing device may store the real-world location indicator and the privacy settings into one or more non-transitory machine-readable storage locations, such as the non-transitory memory of the computing device or a database of a cloud-based data-transaction service provider (e.g., platform database 308 of e-commerce platform 306), or a database of a cloud-based third-party service provider (e.g., merchant database of merchant service), among others. The configuration inputs include various types of privacy settings, which indicate the end-user's preferences for the given types of privacy settings. The privacy settings may include, for example, the real-world location associated with the privacy setting, triggering conditions or instructions that prompt the privacy settings, obfuscation actions, and obfuscation regions.

In some implementations, the privacy settings may indicate, and be relative to, the third-party service providers associated with the receiving device (e.g., merchant computing device), such that third-party service provider devices may receive differently obfuscated media feeds. As an example, the end-user may preconfigure different obfuscation regions for a hairstylist (who does not need to see much of the background or the end-user's body) compared to a doctor (who does not to see much of the background) or an interior decorator (who does not need to see much of the end-user's body).

The end-user need not preconfigure the privacy settings in all embodiments, so the current step 401 may be optional to circumstances in which the end-user wants to setup and store preconfigured privacy settings or to certain embodiments that require preconfigured privacy settings. In some implementations, the end-user may input the privacy settings on the fly at runtime of the application or browser, when the end-user accesses features of the third-party service (or other cloud-application service) and instructs the computing device to transmit the media data to the third-party service provider server or other external device. In such implementations, the end-user may input new or updated privacy settings through the graphical user interface of the computing device. The application or browser of the computing device then transmits the image data to the receive device over one or more networks, which may include applying one or more obfuscations on the media data in accordance with the new, updated, and/or preconfigured privacy settings.

In step 404, the computing device may detect a triggering condition or triggering instruction for prompting a given privacy setting. The privacy settings may include the triggering instruction for the software of the computing device that automatically or responsively instructs the computing device to perform certain actions, when the computing device or other device detects a triggering condition associated with the triggering instruction. As an example, the privacy settings may include triggering instructions for the computing device to generate a reminder or warning notification displayed on the user interface on the computing device, prompting the end-user to invoke or configure the privacy settings (e.g., blanks any ongoing video feed) for a particular real-world location. The computing device performs the triggering instructions in response to the computing device detecting, as a triggering condition, that the computing device entered a particularly sensitive or private real-world location (e.g., bathroom) or sensitive type of real-world location (e.g., public dressing room, locker room) based upon the real-world location data.

In step 406, the computing device may determine one or more obfuscation regions and obfuscation actions that should be applied according to the privacy settings. The obfuscation region may indicate where computing device places the obfuscation within the visual media data. The obfuscation region may include, for example, a privacy curtain defined by a set of coordinates corresponding to the set of coordinates of a secret region within the visual media data that the end-user wishes to obfuscate by applying the obfuscation region. The computing may determine or otherwise generate the set of coordinates defining the obfuscation region, and may apply the obfuscation to the media data according to the obfuscation region.

In some configurations, the computing device may apply the obfuscation at the obfuscation region in accordance with the obfuscation action. The obfuscation action may indicate the character or manner in which the computing device applies or otherwise implements the obfuscation. Non-limiting examples of the obfuscation actions for applying the obfuscation to a portion of the video feed, as indicated by the obfuscation region, includes: blurring the portion of the video feed, excluding or nullifying image data for the portion of the video feed, and replacing the portion of the video with replacement image data for the portion of video feed, among others. In some embodiments, replacing the portion of the video with the replacement image may include presenting the media data as though the object were not present at the obfuscation region, thereby providing a visual representation implementing diminished reality. In such embodiments, the diminished reality functions replace the "reality" within the obfuscation region with image elements generated by augmented reality operations, which execute machine-learning operations that predict the missing image data (i.e., behind the object to be obfuscated) that would ordinarily or otherwise be situated within the obfuscation region.

In step 408, the computing device may transmit the media data feed to the third-party service provider device, where the media data feed includes the obfuscation as applied by the computing device according to the obfuscation action for the obfuscation region.

FIG. 5 shows steps of a method 500 for determining end-user privacy settings associated with a real-world location to be applied in given circumstance, and applying the end-user privacy settings and obfuscations to a media feed in accordance with the end-user privacy settings. Embodiments may include additional, fewer, or different operations than those described in the method 500. For ease of description, a computing device performs the operations and steps of the method 500, though any number of computing devices or processors may perform the various operations described in FIG. 5 and steps of the method 500. As an example, the computing device may include any type of computing device (e.g., customer device 302) that performs the steps and operations of the method 500, such as a laptop, smartphone, tablet, personal computer, or server computer, among others. As another example, in some implementations, the computing device of the method 500 may include the computing device and one or more servers of a data-transaction provider platform service (e.g., platform server 318 of e-commerce platform 306), such that the computing device and the servers may each perform certain operations or steps of the method 500. In another example, in some implementations, the computing device of the method 500 may include the one or more servers of the data-transaction provider platform that perform most or all of the functions and steps of the method 400, where the computing device performs few, if any, operations or steps of the method 500.

In step 502, the computing device may receive real-world location data from an end-user. The computing device may also receive one or more configuration inputs indicating that end-user privacy settings are associated with the real-world location. Non-limiting examples of the real-world location data may include explicit geolocation information (e.g., geolocation, location type, geo-fenced location) or implicit location information that the computing device may reference to derive or determine the real-world location (e.g., Wi-Fi connections typically available at the real-world location, object recognition of objects known or predicted at the real-world location or type of real-world location). Non-limiting examples of the end-user privacy settings may include the triggering instructions or conditions, obfuscation region(s), obfuscation action(s), the indication of the real-world location associated with the privacy settings, and an indication of the receiving party associated with the privacy settings, among others.

The real-world location may be a physical locality associated with certain privacy settings where the computing device wants to exercise certain privacy controls (e.g., obfuscations) over the media data transmitted to a receiving device. The real-world location may be the locality in which the optical sensors and/or microphone of the computing device may capture sensitive image media data or audio signals that the end-user does not want transmitted to the receiving device. For instance, the end-user may transmit a media feed from the end-user's home office, where the optical sensor's field-of-view captures imagery of the end-user's home office, but also the end-user's bedroom or bathroom through a doorway. The end-user may configure privacy settings associated with the end-user's home or home office as the real-world location, where the privacy settings instruct the computing device or other device (e.g., platform server) to apply obfuscation regions (e.g., privacy curtain) on the visual media data, thereby obfuscating a third-party service provider-user's (or other user's) view of the end-user's bedroom or bathroom.

The real-world location may be an absolute location or a relative or contextualized location. Continuing with the example mentioned above, in which the end-user wants to configure privacy settings for the end-user's home office, the real-world location may be the absolute location of the home office or house (e.g., lat-long, address) or other absolute and explicit geolocation; the real-world location may be a relative or contextual location based upon, for example, a geo-fence for certain coordinates (e.g., computing device situated within bounded set of streets nearby the end-user's home or bounded set of geo-coordinates), or pre-configured labels associated with a visual mapping generated for the physical space indicating certain types of locations (e.g., preconfigured labels mapped to visual doorway attributes of the home office physical space that indicate the bathroom or bedroom doorways).

In some cases, the end-user may configure privacy setting for a particular real-world location or for a class of real-world locations. For example, the end-user may configure privacy settings for the end-user's home office using various geolocation indicators (e.g., lat-long, home Wi-Fi connectivity) in which the computing device applies the privacy settings for the home office indicate the computing device is situated in the end-user's home or home office. As another example, the end-user may configured privacy settings for dressing rooms based upon any number of types of data or inputs indicating that the computing device is situated in a dressing room, such as signals received from the wireless beacons of a department store.

The computing device may store the privacy settings in memory of the computing device or at a remote database. The privacy settings may be stored with end-user profile data according to the privacy settings received from the end-user, including the indication of the real-world location associated with the privacy settings.

In step 504, the computing device detects that the computing device is situated in the real-world location based upon one or more types of data indicating the real-world location. As an example, the computing device may detect that computing device is situated in the real-world location based upon the geolocation data (e.g., lat-long) or other types of expected data or signals. As another example, the computing device may detect that the computing is situated in the real-world location by a executing an object recognition engine of a machine-learning architecture, where the object recognition engine identifies and recognizes a threshold number of objects known to be in the real-world location or types of objects predicted to be in the type of real-world location in which the computing device is situated. The computing device or the database may store the known-expected (e.g., pre-stored geolocation data) or predicted-expected location data, which the computing device may reference when determining whether the computing device is situated in the real-world location.

In step 506, the computing device may apply the obfuscation action to the obfuscation region of the media data feed responsive to a triggering instruction, in accordance with the privacy settings associated with the real-world location. In other embodiments, the data-transaction provider platform may apply the obfuscation action to the media data feed received from the computing device.

The privacy settings may include the obfuscation region indicating the placement for the obfuscation within the visual media data. In some cases, the end-user previously indicated the obfuscation region (in step 502) or, in some cases, the computing device may generate a notification prompting the end-user to enter further configuration inputs indicating the obfuscation region for the privacy settings. The obfuscation region may include, for example, a privacy curtain defined by a set of coordinates corresponding to the set of coordinates of a secret region within the visual media data that the end-user wishes to obfuscate by applying the obfuscation region. In some implementations, the obfuscation region may be defined by the set of 3D coordinates mapped to the 3D coordinate system generated for the physical space by the computing device or another device. The computing device determines the set of coordinates for the obfuscation region and applies the obfuscation region to the visual media data according to the set of coordinates.

The privacy settings may include the obfuscation action that indicates the character or manner in which the computing device applies or otherwise implements the obfuscation. The obfuscation action may instruct the computing device to perform a certain action for applying the obfuscation to the coordinates of the obfuscation region. For example, the obfuscation action may instruct the computing device to blur or pixelate the obfuscation region. As another example, the obfuscation action may instruct the computing device to apply or include a preconfigured image file, a pattern, or other visual effect at the obfuscation region. In this way, the obfuscation region may behave as a green screen or canvas on which the computing device applies the obfuscation action. As another example, the obfuscation action may include halting or blanking the visual media data transmitted to the receiving device.

The privacy settings may include the triggering instruction for the software of the computing device that automatically or responsively instructs the computing device to perform certain actions, when the computing device or other device detects a triggering condition associated with the triggering instruction. As in the earlier example, the privacy settings may include triggering instructions for the computing device to generate a reminder or warning notification displayed on the user interface of the computing device, prompting the end-user to invoke or configure the privacy settings (e.g., blanks any ongoing video feed) for a particular real-world location. The computing device may perform the triggering instructions in response to the computing device detecting, as a triggering condition, that the computing device entered a particularly sensitive or private real-world location (e.g., bathroom) or sensitive type of real-world location (e.g., public dressing room, locker room) based upon the real-world location data.

The end-user may include various combinations of any number of triggering instructions, obfuscation regions, and obfuscation actions for the real-world location. As an example, for the end-user's home office (real-world location), the end-user may configure privacy settings that include a privacy curtain situated at a bathroom doorway (obfuscation region), and instruct the computing device to generate the bathroom privacy curtain with a white color that matches the walls of the room (obfuscation action). The end-user may further configure the privacy settings for the home office to responsively generate blank or nullified audio and visual media data for the media data feed (obfuscation action) across the optical sensor's point-of-view and microphone's range (obfuscation region), when an object rejection or body tracking engine of the machine-learning architecture executed by the computing device detects that the end-user's coordinate path traverses the coordinates of the privacy curtain. By configuring various combinations of privacy settings, the computing device may generate and transmit the media feed to the third-party service provider device (or other receiving device), where the bathroom is seamlessly obfuscated while the end-user is speaking with the third-party service provider-user "on camera," but then the computing device may blank the media feed when the end-user goes to the bathroom.

In step 508, the computing device may transmit the media data feed having the obfuscation region(s) via one or more networks to one or more receiving device(s) (e.g., third-party service provider device or other users' devices).

Example Use Cases

FIGS. 6A-6E illustrate a graphical user interface 600 of a customer device (e.g., mobile device), displaying various perspectives of a living room 3D physical space (living room 601) as a real-world location of the customer. Software of the customer device displays the graphical user interface 600 to the customer during a configuration operation allowing the customer is enter privacy settings for the living room 601. The graphical user interface 600 allows the user to preview the visual data of media data that the customer device will stream to a receiving device. In this way, the FIGS. 6A-6E illustrates the graphical user interface 600 of the customer device during the configuration operations, but FIGS. 6C-6E may be considered to likewise illustrate the graphical user interface 600 of a receiving device, displaying the media data as received from the customer device with one or more obfuscation regions (sometimes referred to herein as a privacy curtain 605).

Figure 6A:
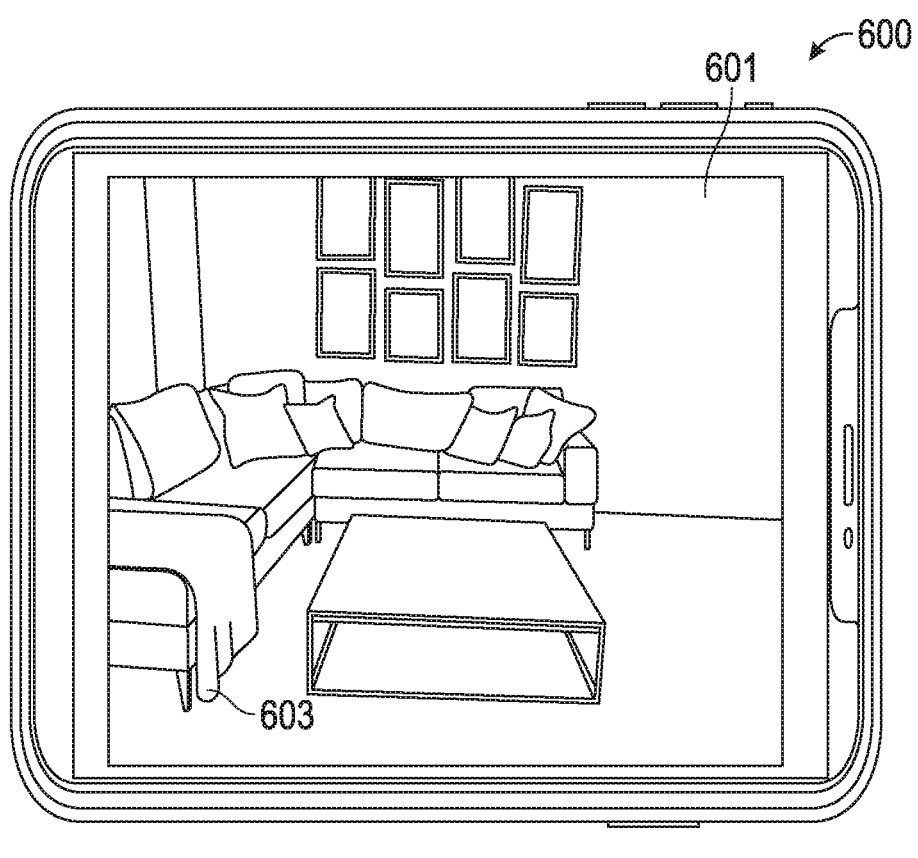
FIGS. 6A-6E illustrates a graphical user interface of a customer device, displaying various sensor-generated perspectives of a living room 3D physical space, according to an embodiment.
Figure 6B:
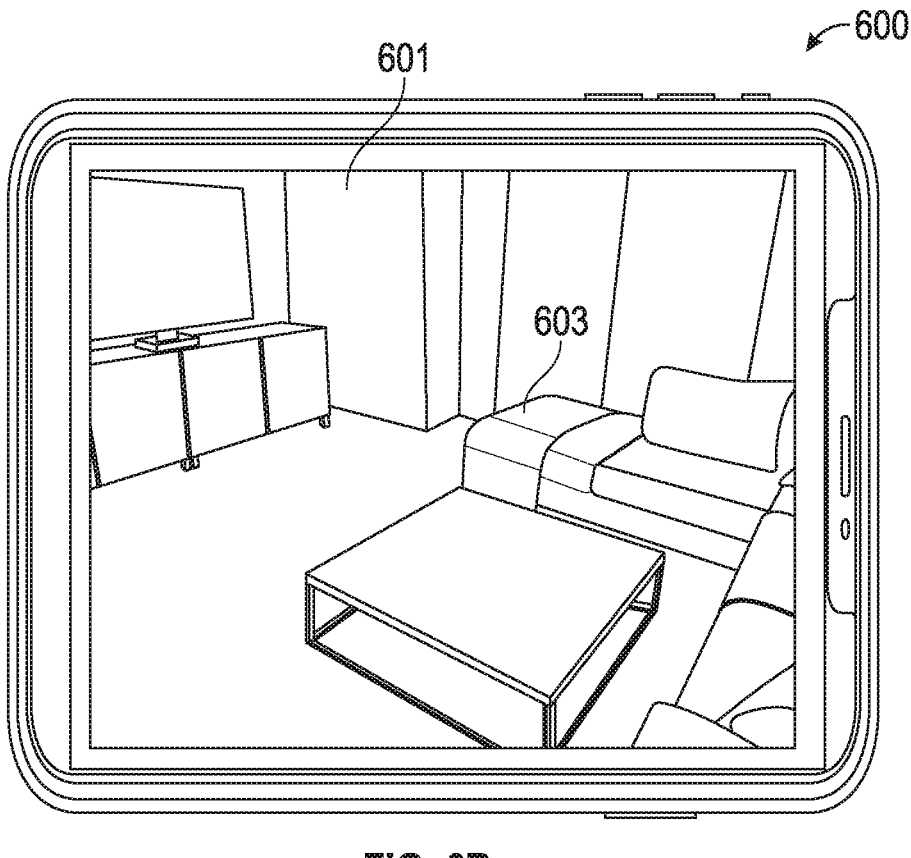
Figure 6C:
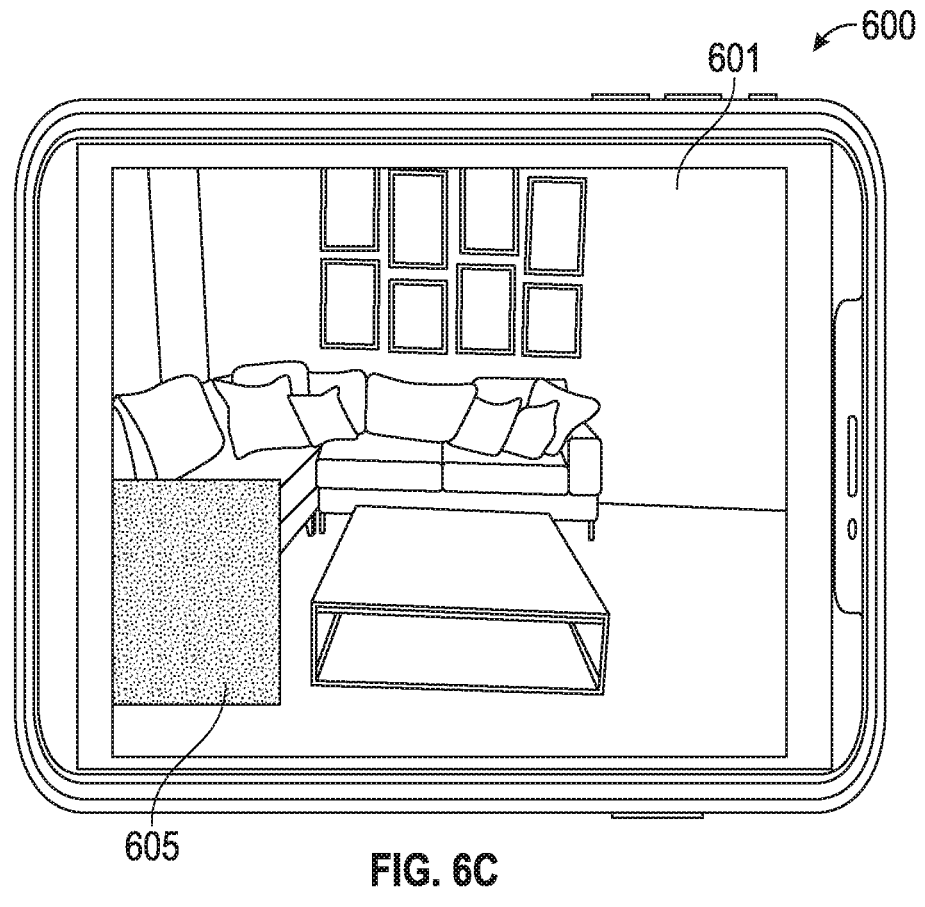
Figure 6D:
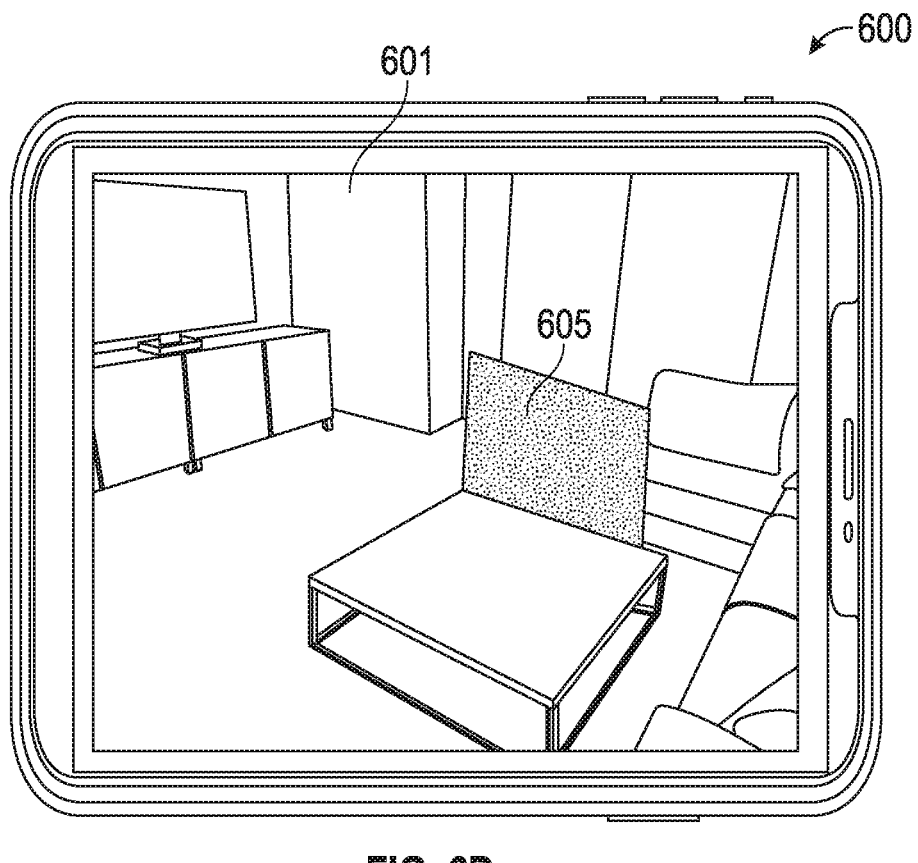

FIGS. 6A-6B illustrate the graphical user interface 600 having a 3D secret region 603 of the living room 601 representing a set of 3D coordinates mapped to the 3D coordinate system of the 3D space. The 3D coordinates of the secret region 603 may indicate a portion of media data that the customer would like obfuscated in the media feed, as indicated by the privacy settings for the living room 601. FIGS. 6C-6D illustrate the graphical user interface 600 updated by the software of the customer device to display the privacy curtain 605, situated in the graphical user interface 600 according to the coordinates of the secret region 603.

Additionally or alternatively, in some implementations, obfuscation regions may be included in the media feed based upon the contours or attributes of the physical space. For example, the customer device may execute computer vision and object recognition engines of a machine-learning architecture, which may be configured to determine the contours of the living room 601, where the customer device may identify surfaces and/or objects and map the surfaces or objects to the 3D coordinate system generated for the living room 601. The machine-learning architecture may be trained to identify doorframes or doorways based upon, for example, identifying gaps in a wall surface of a threshold doorway prediction threshold. The customer device may automatically generate or suggest a doorway privacy curtain 607, which the customer may enter a configuration input confirming that the privacy settings of the living room 601 should include the doorway privacy curtain 607 at the given coordinates of the automatically detected doorway. For instance, the doorway of the living room 601 may lead to a bathroom, which the customer may want to obfuscate from the media feed. The customer may execute, for example, an application allowing the customer to discuss interior design options with a merchant-user via video chat. The application may detect the doorway in the living room 601, allowing the customer to establish the doorway privacy curtain 607 to obfuscate the bathroom from the media data transmitted to the merchant's device.

Figure 6E:
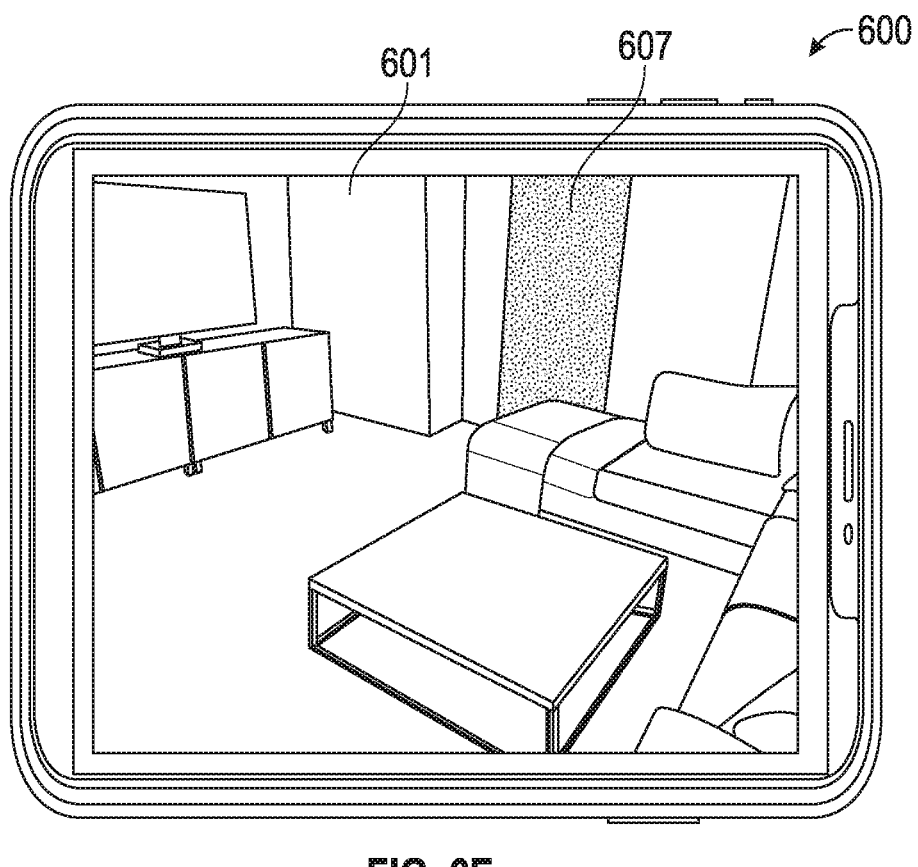

FIG. 6E shows this approach for obfuscating portions of the media feed according to the doorway privacy curtain 607, where a customer device updates the graphical user interface 600 to display the doorway privacy curtain 607 at the coordinates of the doorway of the living room 601. In some configurations, the customer device may automatically detect and generate the doorway privacy curtain 607 and/or automatically detect and suggest regions of the living room 601 for obfuscation. In this way, the customer need not preconfigure the privacy settings for the doorway privacy curtain 607. The software of the customer device may dynamically detect and suggest the doorway privacy curtain 607 on the fly (e.g., when the doorway appears in the optical sensor view, upon an input by the customer, upon presence of another user), prompting the customer to enter configuration inputs that confirm whether the customer device should include the doorway privacy curtain 607 in the privacy settings for the living room 601.

Figure 7A:
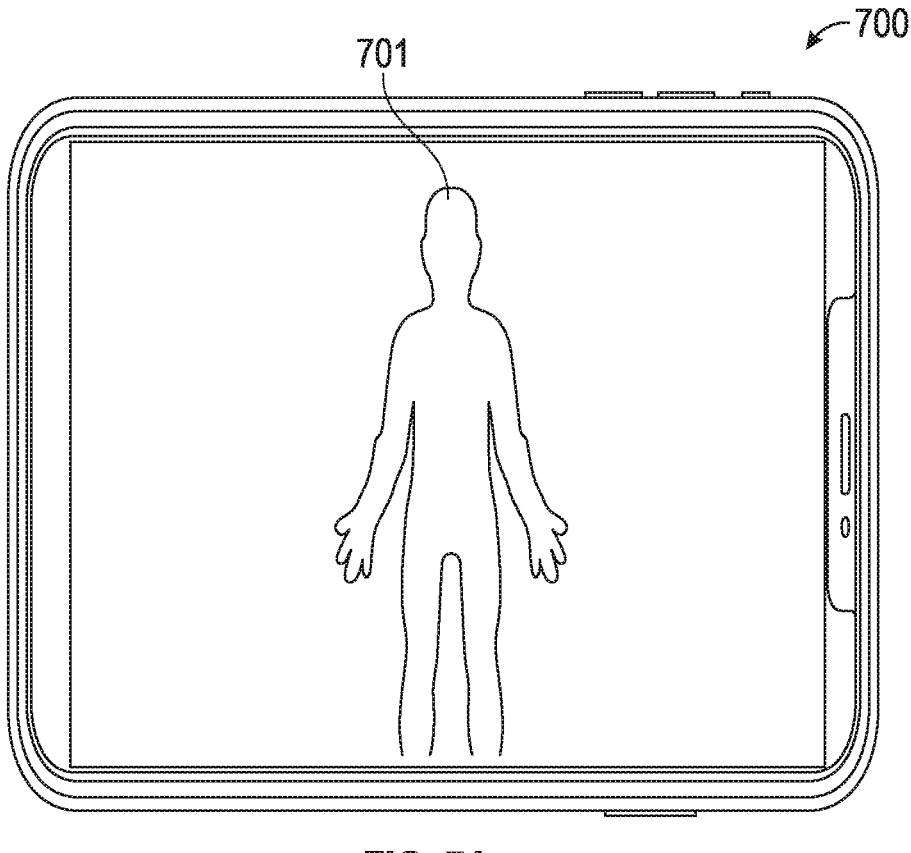
FIGS. 7A-7B illustrates a graphical user interface of a customer device, displaying a sensor-generated image of a customer-user before and after applying gesture-based obfuscation regions, according to an embodiment.
Figure 7B:
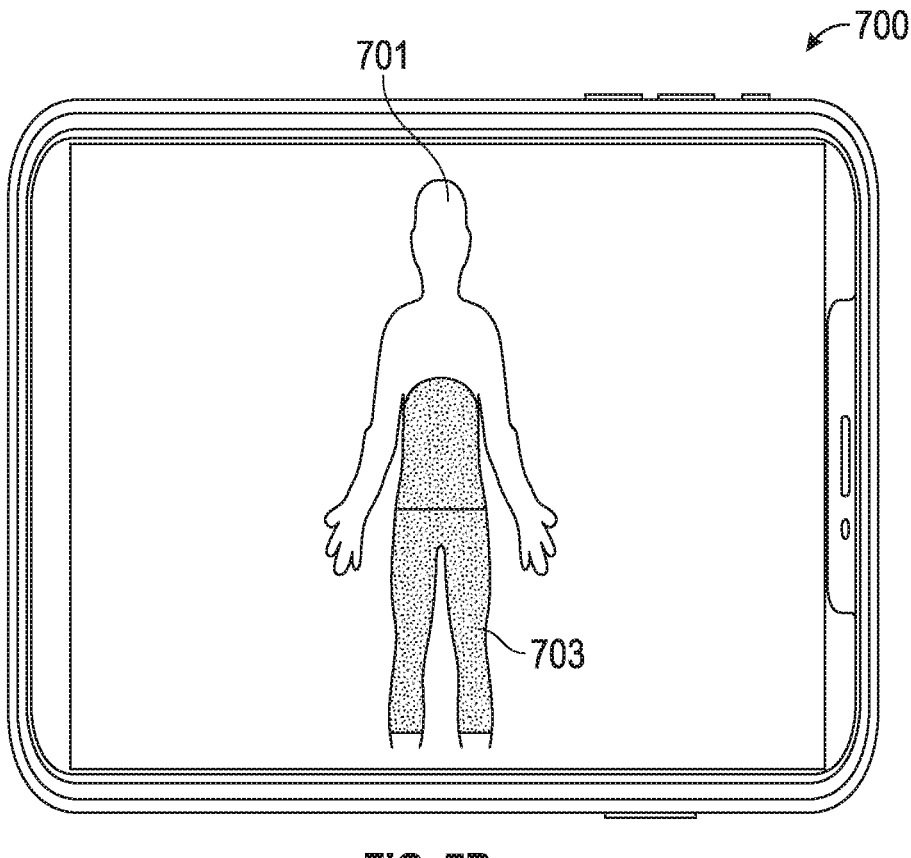

FIGS. 7A-7B illustrate a graphical user interface 700 of a customer device (e.g., mobile device), displaying an image of a customer-user (customer 701) captured by an optical sensor of the customer. The customer may input gesture-based obfuscation regions (sometimes referred to as privacy paint or painted region 703) according to the customer's 701 gestures (e.g., hand waving) captured by an optical sensor of the customer device. Alternatively, the customer may input boundaries, edges, or other demarcations indicating coordinates of the obfuscation region using a touchscreen, stylus, mouse, other input mechanism.

Software of the customer device may display the graphical user interface 700 to the customer 701 during a privacy configuration operation that allows the customer 701 to enter current or preconfigured privacy settings. The privacy settings may be associated with a real-world location (e.g., dressing room, bathroom, closet) and/or a receiving device (e.g., merchant server) of a particular merchant service (e.g., private shopper fashion merchant). In some cases, the customer 701 may preconfigure the privacy settings before the software of the customer device establishes an online interactive session between the customer device and a merchant device (or other receiving device). In some cases, the customer 701 may input the privacy settings on the fly, during the interactive session between the customer device and the merchant device.

As shown in FIGS. 7A-7B, during the privacy configuration operations, the graphical user interface 700 may display a preview of the visual data that the customer device would stream to the receiving device during the interactive session. In this way, FIGS. 7A-7B illustrate the graphical user interface 700 of the customer device during the configuration operation, but also similarly illustrate the graphical user interface 700 that would be displayed at the receiving device during the interactive session, where the graphical user interface 700 would display the media data as received from the customer device according to the privacy settings.

The software of the customer device or other computing device (e.g., platform server) executes machine-learning architecture including a body recognition or gesture recognition engine. The gesture recognition engine may be trained to recognize the customer's 701 hands and track the motions of the hands moving through a 2D or 3D coordinate system of the physical space. The gesture recognition engine stores the coordinates defining the path of the customer's 701 hands through the physical space, and stores the coordinates of the customer's path as the privacy paint 703. In some implementations, the customer device may pin or anchor the privacy paint 703 to body parts of the customer 701 and/or objects or surfaces recognized by the machine-learning architecture. In this way, the coordinates of the privacy paint 703 may remain relative to the customer 701, where the customer device updates the coordinates of the privacy paint 703 as the customer 701 moves around the physical space 703. The privacy paint 703 may be pinned to secret regions that the customer wishes to obfuscate from view. The customer device may include the privacy paint 703 as an obfuscation region that the customer device includes in the media feed transmitted to the merchant device.

FIG. 7A illustrates the graphical user interface 700 having the customer 701 situated in a 3D physical space without any privacy paint 703 to indicate obfuscation regions. In some embodiments, the customer device may generate a 3D coordinate system mapping attributes (e.g., the customer 701, objects) captured by the optical sensor, though some embodiments need not generate the 3D coordinate system. When the customer 701 selects a privacy configuration option in the graphical user interface 700, the customer may gesture (e.g., wave hand) within the field-of-view of the optical sensors to generate the privacy paint 703 indicating the painted obfuscation regions. The 2D or 3D coordinates of the painted region 703 indicates a portion of the media data that the customer would like obfuscated in the media feed. FIG. 7B illustrates the graphical user interface 700 updated by the software of the customer device to display the privacy paint 703, situated in the graphical user interface 700 according to the coordinate path of the customer's 701 gestures captured by the optical sensor. In the example of FIG. 7B, the customer 701 wishes to cover portions of the customer's 701 body that may not be relevant to an upcoming video-based discussion with the merchant to discuss, for example, sweaters, hats, makeup, hairstyling, or other products or services that would not require the merchant to see lower portions of the customer's 701 body.

In some implementations, the customer 701 may associate the privacy settings with the real-world location, such as a dressing room, such that the customer device may prompt the customer 701 to input the privacy paint 703 or the customer device may fetch preconfigured privacy paint 703 stored in a local or remote database. Preconfigured triggering instructions of the privacy settings may instruct the customer device to request or fetch the privacy paint 703 based upon certain location indicators that indicate the real-world location to customer device, such as beacons indicating a dressing room, geo-fencing data indicating a particular real-world location, geolocation data (e.g., lat-long), or the like.

In some implementations, the customer 701 may associate the privacy settings with the merchant service, where different merchant services receive different privacy paint 703 obfuscations according to the customer's 701 preferences. The customer device may prompt the customer 701 to input the privacy paint 703 or the customer device may fetch preconfigured privacy paint 703 stored in a local or remote database. As an example, the customer may preconfigure different painted regions 703 for a hairstylist (who need not see much of the background or the customer's 701 body) compared to a doctor (who need not see much of the background) or an interior decorator (who need not see much of the customer's 701 body). The preconfigured triggering instructions of the privacy settings may instruct the customer device to request or fetch the privacy paint 703 based upon certain location indicators and/or the receiving merchant device where the customer device will transmit the media feed.

In some embodiments, a computer-implement method comprises determining, by a computing device, a real-world location and a privacy setting associated with the real-world location detected based on a visual attribute of the real-world location in a video feed from an optical sensor; applying, by the computing device, an obfuscation to a portion of the video feed according to the privacy setting associated with the real-world location; and providing, by the computing device, the video feed having the obfuscation of the portion for display at a user interface.

In some implementations, the method further comprises obtaining, by the computing device, a set of coordinates defining an obfuscation region in a field-of-view captured by the optical sensor. The obfuscation region in the field-of-view corresponds to the obfuscation applied to the portion of the video feed.

In some implementations, the computing device receives the set of coordinates defining the obfuscation region according to one or more user inputs entered using a graphical user interface.

In some implementations, the method further comprises identifying, by the computing device, one or more objects in the field-of-view captured by the optical sensor by applying an object recognition engine to the image data generated by the optical sensor; and detecting, by the computing device, the real-world location for the field-of-view captured by the optical sensor using the one or more objects identified from the image data as the visual attribute of the real-world location. The computing device applies the obfuscation on the portion of the video feed containing the object identified in the image data.

In some implementations, the method further comprises identifying, by the computing device, a user in the field-of-view captured by the optical sensor by applying an object recognition engine to the image data generated by the optical sensor; and responsive to the computing device determining that the user traversed the set of coordinates defining the obfuscation region, halting, by the computing device, the video feed.

In some implementations, the set of coordinates defining the obfuscation region are fixed within a three-dimensional space included in the field-of-view captured by the optical sensor and independent of a current field-of-view captured by the optical sensor.

In some implementations, the method further comprises identifying, by the computing device, a set of user gestures associated with a person in a field-of-view of the optical sensor by applying an object recognition engine on image data including the set of gestures of the person; and determining, by the computing device, an obfuscation region based on a set of coordinates from the set of user gestures. The obfuscation region in the field-of-view corresponds to the obfuscation applied to the portion of the video feed.

In some implementations, the method further comprises detecting, by the computing device executing the object recognition engine, a hand of the person in the image data; and generating, by the computing device, the set of coordinates from the set of user gestures by determining for each user gesture one or more coordinates of the hand at the particular user gesture.

In some implementations, applying the obfuscation to the portion of the video feed includes at least one of: blurring the portion of the video feed, excluding image data for the portion of the video feed, and replacing the portion of the video with replacement image data for the portion of video feed.

In some implementations, the method further comprises identifying, by the computing device, an object in a field-of-view captured by the optical sensor by applying an object recognition engine to image data generated by the optical sensor. The object identified by the computing device is the visual attribute for detecting the real-world location.

In some embodiments, a system comprises a computing device comprising a processor for executing machine-readable instructions stored in a non-transitory medium. The computing device is configured to determine a real-world location and a privacy setting associated with the real-world location detected based on a visual attribute of the real-world location in a video feed from an optical sensor; apply an obfuscation to a portion of the video feed according to the privacy setting associated with the real-world location; and provide the video feed having the obfuscation of the portion for display at a user interface.

In some implementations, the computing device is further configured to obtain a set of coordinates defining an obfuscation region in a field-of-view captured by the optical sensor. The obfuscation region in the field-of-view corresponds to the obfuscation applied to the portion of the video feed.

In some implementations, the computing device is configured to receive the set of coordinates defining the obfuscation region according to one or more user inputs entered using a graphical user interface.

In some implementations, the computing device is further configured to identify one or more objects in the field-of-view captured by the optical sensor, where the computing device applies an object recognition engine to the image data generated by the optical sensor; and detect the real-world location for the field-of-view captured by the optical sensor using the one or more objects identified from the image data as the visual attribute of the real-world location. The computing device applies the obfuscation on the portion of the video feed containing the object identified in the image data.

In some implementations, the computing device is further configured to identify a user in the field-of-view captured by the optical sensor by applying an object recognition engine to the image data generated by the optical sensor; and responsive to the computing device determining that the user traversed the set of coordinates defining the obfuscation region, halt the video feed.

In some implementations, the set of coordinates defining the obfuscation region are fixed within a three-dimensional space included in the field-of-view captured by the optical sensor and independent of a current field-of-view captured by the optical sensor.

In some implementations, the computing device is further configured to identify a set of user gestures associated with a person in a field-of-view of the optical sensor by applying an object recognition engine on image data including the set of gestures of the person; and determine an obfuscation region based on a set of coordinates from the set of user gestures. The obfuscation region in the field-of-view corresponds to the obfuscation applied to the portion of the video feed.

In some implementations, the computing device is further configured to detect, by executing the object recognition engine, a hand of the person in the image data; and generate the set of coordinates from the set of user gestures by determining for each user gesture one or more coordinates of the hand at the particular user gesture.

In some implementations, applying the obfuscation to the portion of the video feed includes at least one of: blurring the portion of the video feed, excluding image data for the portion of the video feed, and replacing the portion of the video with replacement image data for the portion of video feed.

In some implementations, the computing device is further configured to identify an object in a field-of-view captured by the optical sensor by applying an object recognition engine to image data generated by the optical sensor. The object identified by the computing device is the visual attribute for detecting the real-world location.

In some embodiments, a machine-readable storage medium having computer-executable instructions stored thereon that, when executed by one or more processors, cause the one or more processors to perform operations comprising: determining a real-world location and a privacy setting associated with the real-world location detected based on a visual attribute of the real-world location in a video feed from an optical sensor; applying an obfuscation to a portion of the video feed according to the privacy setting associated with the real-world location; and providing the video feed having the obfuscation of the portion for display at a user interface.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implement method comprising:
detecting, by a computing device of a first user, a visual attribute of a real-world location of the computing device within a video feed from an optical sensor for transmission to a second device of a second user;
determining, by the computing device, the real-world location of the computing device based upon geolocation data and the visual attribute indicative of the real-world location of the computing device;
determining, by the computing device, a privacy setting entered by the first user for the real-world location based on detecting the visual attribute of the real-world location in the video feed from the optical sensor and an identity of the second user; and
in response to determining the privacy setting for the real-world location of the computing device using the geolocation data and the detected visual attribute:
applying, by the computing device, an obfuscation relative to the second user to a portion of the video feed according to a set of coordinates for the real-world location indicated by the privacy setting associated with the real-world location and the identity of the second user;
providing, by the computing device, the video feed having the obfuscation of the portion according to the set of coordinates for the real-world location for display at a user interface; and
responsive to the computing device determining that the first user traversed a set of coordinates defining an obfuscation region, halting, by the computing device, the video feed prior to transmission.

2. The method according to claim 1, further comprising obtaining, by the computing device, the set of coordinates defining an obfuscation region in a field-of-view captured by the optical sensor, wherein the obfuscation region in the field-of-view corresponds to the obfuscation applied to the portion of the video feed.

3. The method according to claim 2, wherein the computing device receives the set of coordinates defining the obfuscation region according to one or more user inputs entered using a graphical user interface.

4. The method according to claim 2, further comprising:
identifying, by the computing device, one or more objects in the field-of-view captured by the optical sensor by applying an object recognition engine to image data generated by the optical sensor; and
detecting, by the computing device, the real-world location for the field-of-view captured by the optical sensor using the one or more objects identified from the image data as the visual attribute of the real-world location, wherein the computing device applies the obfuscation on the portion of the video feed containing the object identified in the image data.

5. The method according to claim 2, further comprising:
identifying, by the computing device, a user in the field-of-view captured by the optical sensor by applying an object recognition engine to image data generated by the optical sensor.

6. The method according to claim 2, wherein the set of coordinates defining the obfuscation region are fixed within a three-dimensional space included in the field-of-view captured by the optical sensor and independent of a current field-of-view captured by the optical sensor.

7. The method according to claim 1, further comprising:
identifying, by the computing device, a set of user gestures associated with a person in a field-of-view of the optical sensor by applying an object recognition engine on image data including the set of gestures of the person; and
determining, by the computing device, an obfuscation region based on the set of coordinates from the set of user gestures, wherein the obfuscation region in the field-of-view corresponds to the obfuscation applied to the portion of the video feed.

8. The method according to claim 7, further comprising:
detecting, by the computing device executing the object recognition engine, a hand of the person in the image data; and
generating, by the computing device, the set of coordinates from the set of user gestures by determining for each user gesture one or more coordinates of the hand at the particular user gesture.

9. The method according to claim 1, wherein applying the obfuscation to the portion of the video feed includes at least one of: blurring the portion of the video feed, excluding image data for the portion of the video feed, or replacing the portion of the video with replacement image data for the portion of the video feed.

10. The method according to claim 1, further comprising identifying, by the computing device, an object in a field-of-view captured by the optical sensor by applying an object recognition engine to image data generated by the optical sensor, wherein the object identified by the computing device is the visual attribute for detecting the real-world location.

11. A system comprising:

a computing device of a first user comprising a processor for executing machine-readable instructions stored in a non-transitory medium and configured to:

detect a visual attribute of a real-world location of the computing device within a video feed from an optical sensor for transmission to a second device of a second user;

determine the real-world location of the computing device based upon geolocation data and the visual attribute indicative of the real-world location of the computing device;

determine a privacy setting entered by the first user for the real-world location based on detecting the visual attribute of the real-world location in the video feed from the optical sensor and an identity of the second user; and in response to determining the privacy setting for the real-world location of the computing device using the geolocation data and the detected visual attribute:

apply an obfuscation relative to the second user to a portion of the video feed according to a set of coordinates for the real-world location indicated by the privacy setting associated with the real-world location and the identity of the second user;

provide the video feed having the obfuscation of the portion according to the set of coordinates for the real-world location for display at a user interface; and responsive to determining that the first user traversed a set of coordinates defining an obfuscation region, halt the video feed prior to transmission.

12. The system according to claim 11, wherein the computing device is further configured to obtain the set of coordinates defining an obfuscation region in a field-of-view captured by the optical sensor, wherein the obfuscation region in the field-of-view corresponds to the obfuscation applied to the portion of the video feed.

13. The system according to claim 12, wherein the computing device is configured to receive the set of coordinates defining the obfuscation region according to one or more user inputs entered using a graphical user interface.

14. The system according to claim 12, wherein the computing device is further configured to:

identify one or more objects in the field-of-view captured by the optical sensor, wherein the computing device applies an object recognition engine to image data generated by the optical sensor; and detect the real-world location for the field-of-view captured by the optical sensor using the one or more objects identified from the image data as the visual attribute of the real-world location, wherein the computing device applies the obfuscation on the portion of the video feed containing the object identified in the image data.

15. The system according to claim 12, wherein the computing device is further configured to:

identify a user in the field-of-view captured by the optical sensor by applying an object recognition engine to image data generated by the optical sensor.

16. The system according to claim 12, wherein the set of coordinates defining the obfuscation region are fixed within a three-dimensional space included in the field-of-view captured by the optical sensor and independent of a current field-of-view captured by the optical sensor.

17. The system according to claim 11, wherein the computing device is further configured to:

identify a set of user gestures associated with a person in a field-of-view of the optical sensor by applying an object recognition engine on image data including the set of gestures of the person; and determine an obfuscation region based on the set of coordinates from the set of user gestures, wherein the obfuscation region in the field-of-view corresponds to the obfuscation applied to the portion of the video feed.

18. The system according to claim 17, wherein the computing device is further configured to:

detect, by executing the object recognition engine, a hand of the person in the image data; and generate the set of coordinates from the set of user gestures by determining for each user gesture one or more coordinates of the hand at the particular user gesture.

19. The system according to claim 11, wherein applying the obfuscation to the portion of the video feed includes at least one of: blurring the portion of the video feed, excluding image data for the portion of the video feed, or replacing the portion of the video with replacement image data for the portion of the video feed.

20. The system according to claim 11, wherein the computing device is further configured to identify an object in a field-of-view captured by the optical sensor by applying an object recognition engine to image data generated by the optical sensor, wherein the object identified by the computing device is the visual attribute for detecting the real-world location.

21. A non-transitory machine-readable storage medium having computer-executable instructions stored thereon that, when executed by one or more processors, cause the one or more processors to perform operations comprising:

detecting a visual attribute of a real-world location of a computing device of a first user within a video feed from an optical sensor for transmission to a second device of a second user;

determining the real-world location of the computing device based upon geolocation data and the visual attribute indicative of the real-world location of the computing device;

determining a privacy setting entered by the first user for the real-world location based on detecting the visual attribute of the real-world location in the video feed from the optical sensor and an identity of the second user; and in response to determining the privacy setting for the real-world location of the computing device using the geolocation data and the detected visual attribute:

applying an obfuscation to a portion of the video feed relative to the second user according to a set of coordinates for the real-world location indicated by the privacy setting associated with the real-world location and the identity of the second user; and providing the video feed having the obfuscation of the portion according to the set of coordinates for the real-world location indicated by for display at a user interface; and responsive to determining that the first user traversed a set of coordinates defining an obfuscation region, halt the video feed prior to transmission.

* * * * *